(12) United States Patent
Graumann

(10) Patent No.: US 6,175,634 B1
(45) Date of Patent: Jan. 16, 2001

(54) ADAPTIVE NOISE REDUCTION TECHNIQUE FOR MULTI-POINT COMMUNICATION SYSTEM

(75) Inventor: David L. Graumann, Vancouver, WA (US)

(73) Assignee: Intel Corporation, Santa Clara, CA (US)

( * ) Notice: Under 35 U.S.C. 154(b), the term of this patent shall be extended for 0 days.

(21) Appl. No.: 08/768,917

(22) Filed: Dec. 17, 1996

Related U.S. Application Data

(63) Continuation-in-part of application No. 08/520,305, filed on Aug. 28, 1995, now Pat. No. 5,598,466.

(51) Int. Cl.[7] .................................................. H04B 15/00
(52) U.S. Cl. ........................ 381/94.1; 381/56; 381/107; 379/406; 379/390; 704/233
(58) Field of Search .................... 381/94.1, 104, 381/107, 120, 56, 57; 379/390, 406, 416, 351; 704/233, 226, 214, 208, 227, 228

(56) References Cited

U.S. PATENT DOCUMENTS

| | | |
|---|---|---|
| 4,028,496 | 6/1977 | LaMarche et al. . |
| 4,147,892 | 4/1979 | Miller . |
| 4,426,730 | 1/1984 | Lajotte et al. . |
| 4,461,024 | 7/1984 | Rengger et al. . |
| 4,630,304 | 12/1986 | Borth et al. . |
| 4,672,669 | 6/1987 | DesBlache et al. . |
| 4,715,063 | 12/1987 | Haddad et al. . |
| 4,796,287 | 1/1989 | Reesor et al. . |
| 4,887,288 | 12/1989 | Erving . |
| 4,959,857 | 9/1990 | Erving et al. . |
| 4,979,214 | 12/1990 | Hamilton . |
| 5,239,574 | 8/1993 | Brandman et al. . |
| 5,255,340 | 10/1993 | Arnaud et al. . |
| 5,293,588 | 3/1994 | Satoh et al. . |
| 5,297,198 | 3/1994 | Butani et al. . |
| 5,323,337 | 6/1994 | Wilson et al. . |
| 5,357,567 | 10/1994 | Barron et al. . |
| 5,459,814 | 10/1995 | Gupta et al. . |
| 5,471,528 | 11/1995 | Reesor . |
| 5,533,118 | 7/1996 | Cesaro et al. . |
| 5,548,638 | 8/1996 | Yamaguchi et al. . |
| 5,579,389 | 11/1996 | Wagner et al. . |
| 5,596,651 * | 1/1997 | Yamaguchi ........................ 381/107 |
| 5,617,508 | 4/1997 | Reaves . |
| 5,737,407 | 4/1998 | Graumann . |
| 5,790,671 * | 8/1998 | Cooper ............................... 381/107 |
| 5,844,994 | 12/1998 | Graumann ........................... 381/56 |

* cited by examiner

*Primary Examiner*—Minsun Oh Harvey
(74) *Attorney, Agent, or Firm*—Blakely, Sokoloff, Taylor & Zafman LLP

(57) ABSTRACT

A technique for suppressing noise in an audio signal is provided. An audio signal is received from an audio input device. A noise level for the audio signal is determined and continuously updated as the audio signal is received. The audio signal is then attenuated according to the relationship between its current energy level and the current noise level. If the audio signal falls below the current noise level, then a constant, maximum attenuation factor is applied to the signal. If the energy of the signal exceeds the noise level but does not exceed a predetermined maximum energy level that is higher than the noise level, then the audio signal is attenuated based on an exponential attenuation function. If the audio signal exceeds the predetermined maximum energy level, then no attenuation is applied. An attack and decay smoothing function dampens the response time of the attenuated output.

28 Claims, 21 Drawing Sheets

ADAPTIVE NOISE REDUCTION TECHNIQUE FOR MULTI-POINT COMMUNICATION SYSTEM

This is a continuation-in-part of application no. 08/520,305, filed on Aug. 28, 1995 now U.S. Pat. No. 5,598,466.

FIELD OF THE INVENTION

The present invention pertains to the field of telecommunications. More particularly, the present invention relates to noise suppression in a video conferencing system.

BACKGROUND OF THE INVENTION

Video conferencing technology enables the users of two or more people at geographically remote locations to have audiovisual communication with each other. Video conferencing is currently possible using a conventional personal computer (PC) equipped with video conferencing software, a video camber, and a connection to a high-speed data link. One video conferencing system which permits multi-point video conferencing using conventional PCs is the ProShare™ Personal Conferencing Video System, which is available from Intel Corporation of Santa Clara, Calif.

A problem associated with almost any communication system is noise. The problem of noise is especially significant in multi-point conferences (conferences between three or more participants), because the overall amount of noise introduced into the system increases as the number of participants increases. In particular, noise in the audio channel can degrade the quality of the transmitted audio signal as well as cause annoyance and ear fatigue to the user. In certain video conferencing systems, audio from several local endpoints (e.g., participating PCs) can be combined into a single audio stream that is transmitted to other, remote endpoints. If the user of any of the local endpoints is not speaking, then those endpoints are introducing unnecessary noise into the audio stream.

Certain disadvantages are associated with some existing solutions to the noise problem. For example, one approach is to first set a threshold volume level, and to then suppress all audio which falls below the threshold level and transmit all audio that exceeds the threshold level. This approach has been referred to as audio gating. The problem with this approach is that audio gating is generally perceivable to the listener as unnaturally abrupt transitions between sound and silence as the speaker speaks. Often, speech passages are partially cut off, such as when a participant is speaking very quietly, or such as in the case of "unvoiced" speech (i.e., sounds that involve no vocal chord movement). In addition, the ambient noise level at any given endpoint may vary significantly during a communication session. However, certain audio gating solutions do not adapt to such changes in the noise level. Some solutions, such as certain noise cancellation techniques, are computationally complex and therefore tend to slow down processing in a local endpoint. As a result, such solutions are not well suited to the mixing of multiple audio streams. Noise cancellation techniques also tend to cause distortion of the speaker's voice.

Therefore, it would be desirable to have a noise suppression solution which improves the overall quality of transmitted audio and which reduces ear fatigue. In particular, it would be desirable to have a noise suppression solution for a video conferencing system which reduces perceivable gating effects and which dynamically adapts to the ambient noise level. It is further desirable that such a solution reduce the processing burden on a microprocessor and reduce distortion of a speaker's voice.

SUMMARY OF THE INVENTION

A method of suppressing noise in a signal is provided. While inputting the signal, a noise level based on the signal is repeatedly updated. An attenuation function is selected from two or more selectable attenuation functions based on the signal and a current state of the noise level. The selected attenuation function is then applied to the signal.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for suppressing noise in an audio signal are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1A:
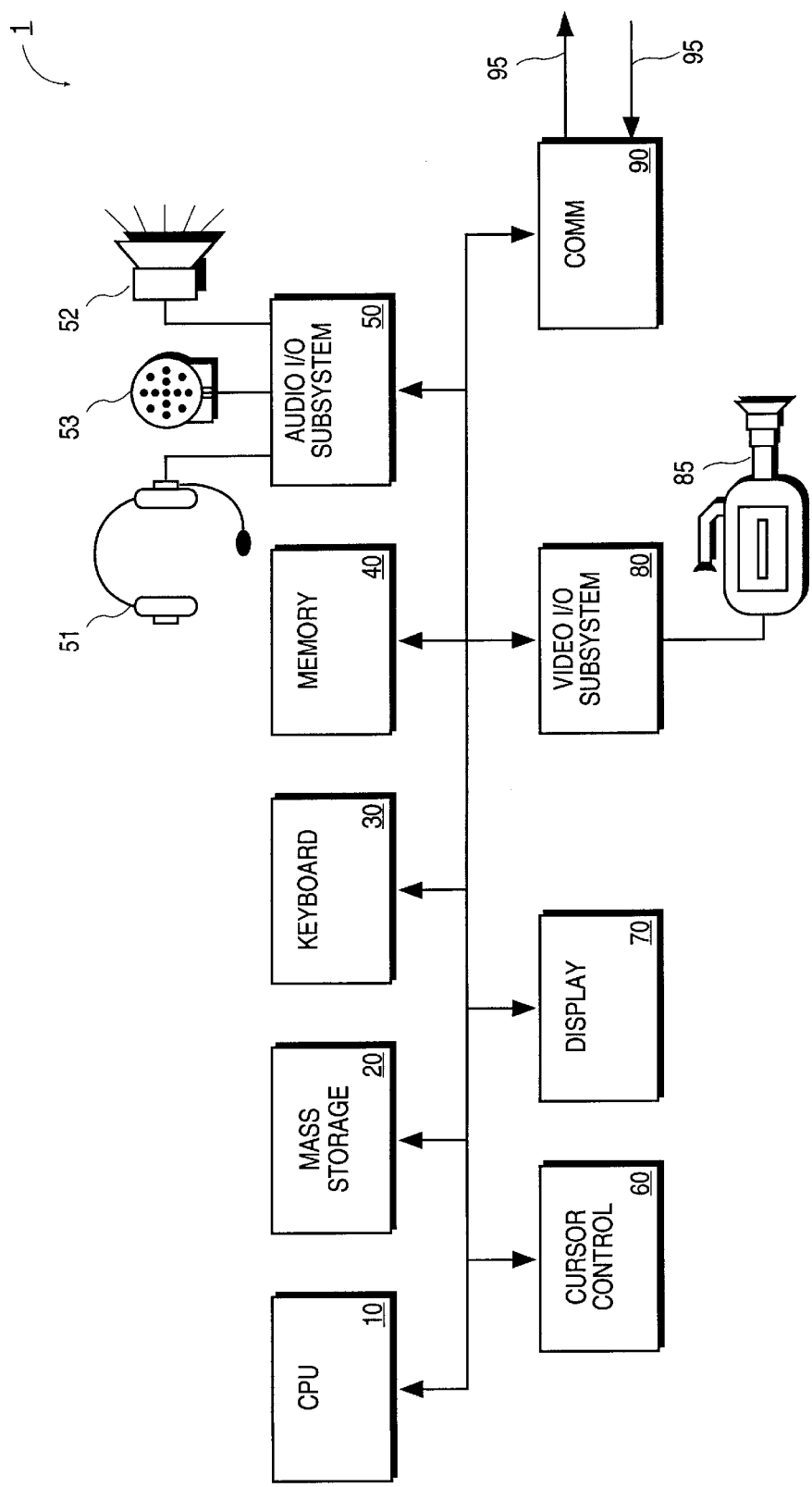
FIG. 1A is a block diagram of a computer system in which the present invention is implemented.

Referring to FIG. 1, the present invention is implemented in a computer system 1 having half-duplex audio communication with at least one other computer system via an audio channel 95. In one embodiment, the audio channel 95 is an Integrated Services Digital Network (ISDN) link. In other embodiments, the audio channel 95 may be a standard computer local area network (LAN), or a telephone connection. In one embodiment, the computer system 1 is a personal computer (PC). The computer system 1 includes a central processing unit (CPU) 10, a mass storage device 20, a keyboard 30, memory 40, an audio input/output (I/O) subsystem 50, a cursor control device 60, a display 70, a video I/O subsystem 80 receiving input from a video camera 85, and an interface device 90, such as a modem, providing an interface between the computer system 1 and the audio channel 95. The audio I/O subsystem 50 is coupled to a speaker 52 and a microphone 53 for open audio communication and to a headset 51 having both a speaker and a microphone for closed audio communication.

Memory 40 represents both random access memory (RAM) and read-only memory (ROM). The cursor control device 60 may be, for example, a mouse, a trackball, a light pen, a stylus with a graphics tablet, or another similar device. The mass storage device 20 may be, for example, a magnetic disk, CD-ROM, CD-R, Digital Versatile Disk (DVD), or another suitable non-volatile data storage device.

In one embodiment, the present invention is carried out in the computer system 1 by the CPU 10 executing sequences of instructions contained in memory 40 (e.g., in RAM). More specifically, execution of the sequences of instructions contained in memory 40 causes the CPU 10 to perform the steps of the present invention, which will be described below. The instructions may be loaded into memory from a persistent store, such as mass storage device 20, and/or from one or more other computer systems (collectively referred to as a "host computer system") over a network. For example, a host computer system may transmit a sequence of instructions to a target computer system in response to a message transmitted to the host computer system over a network by the target computer system. As the target computer system receives the instructions via a network connection, such as a modem, the computer system stores the instructions in memory. The computer system may store the instructions for later execution or execute the instructions as they arrive over the network connection.

In some cases, the downloaded instructions may be directly supported by the CPU 10. Consequently, execution of the instructions may be performed directly by the CPU 10. In other cases, the instructions may not be directly executable by the CPU 10. Under these circumstances, the instructions may be executed by causing the CPU 10 to execute an interpreter that interprets the instructions, or by causing the CPU 10 to execute instructions which convert the received instructions to instructions which can be directly executed by the CPU 10.

In other embodiments, hardwired circuitry may be used in place of, or in combination with, software instructions to implement the present invention. Thus, the present invention is not limited to any specific combination of hardware circuitry and software, nor to any particular source for the instructions executed by a computer system.

Figure 1B:
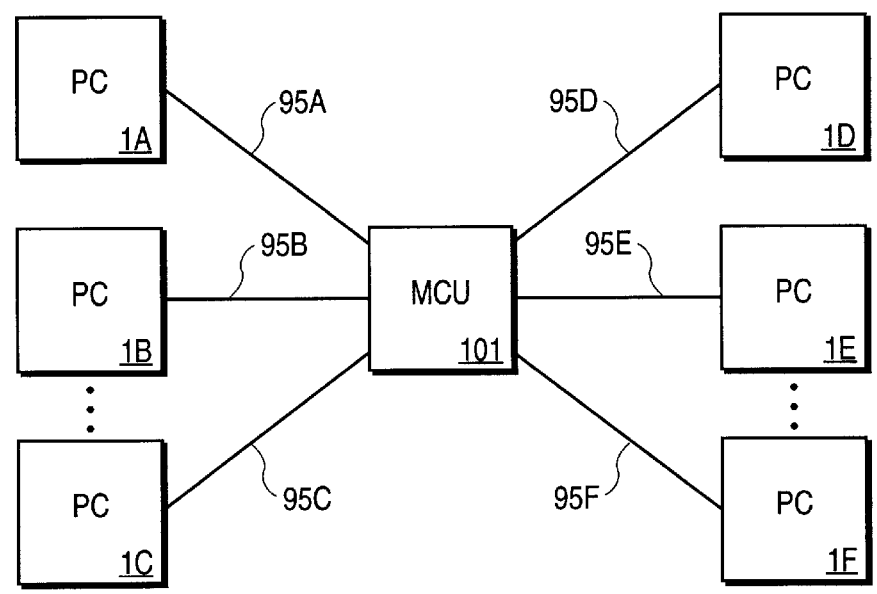
FIG. 1B is a block diagram of several computer systems connected in a configured for a multi-point video conference.

FIG. 1B illustrates a configuration by which several PCs can jointly participate in a video conferencing session. PCs 1A, 1B and 1C are located at one location and are each coupled to a multi-point conference unit (MCU) 101 by a separate audio channel 95A, 95B, and 95C, respectively. PCs 1D, 1E and 1F are located at another (remote) location and are each coupled to the MCU 101 by a separate audio channel 95D, 95E, and 95F, respectively. The MCU 101 combines the audio streams from the PCs 1A through 1F and transmits a combined audio stream to each of the PCs 1A through 1F. The MCU 101 can be conventional PCs configured with appropriate software.

Figure 2:
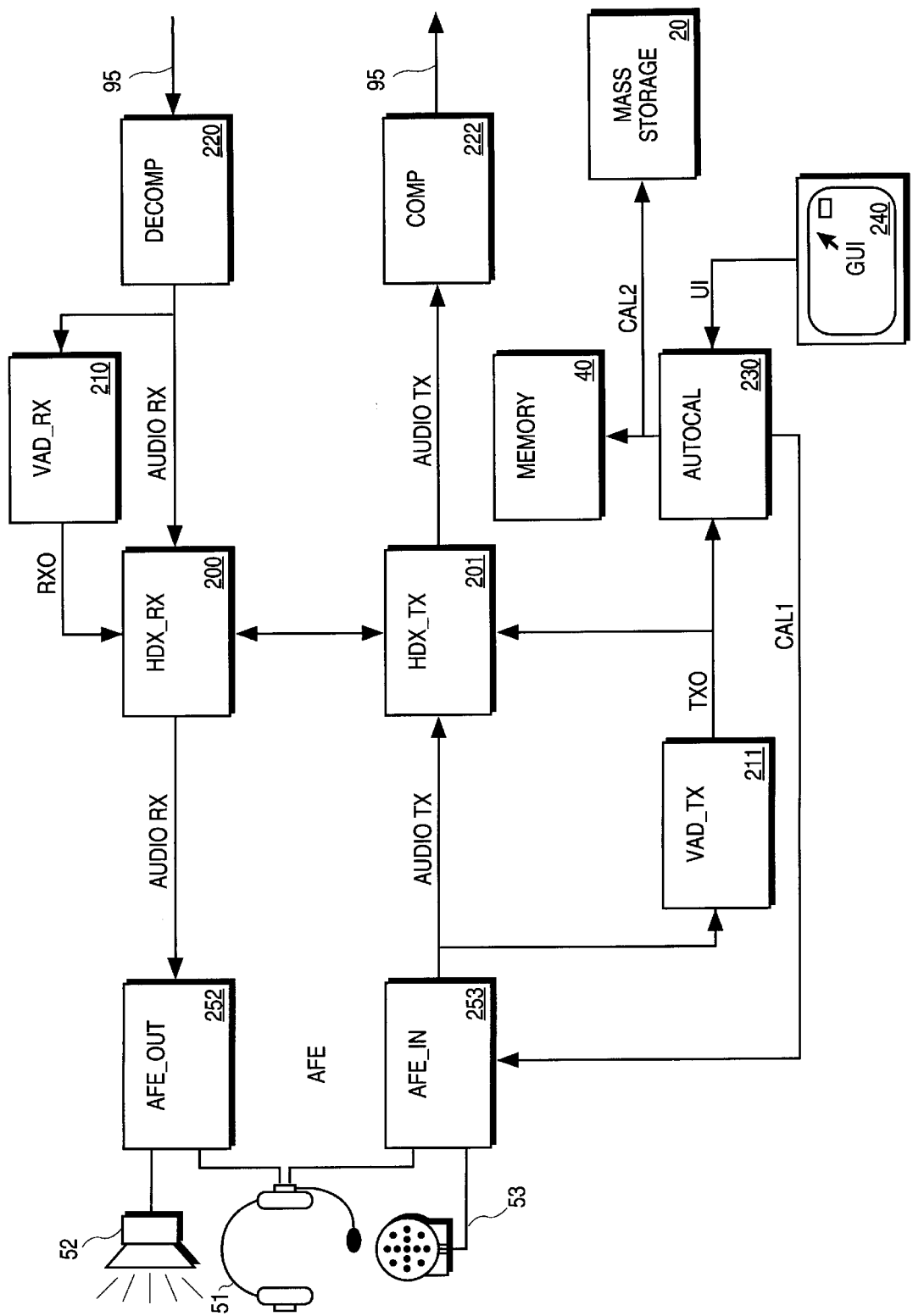
FIG. 2 is a block diagram illustrating the data flow associated with speech detection and automatic calibration of a microphone in a computer system using half-duplex audio communication.
Figure 3:
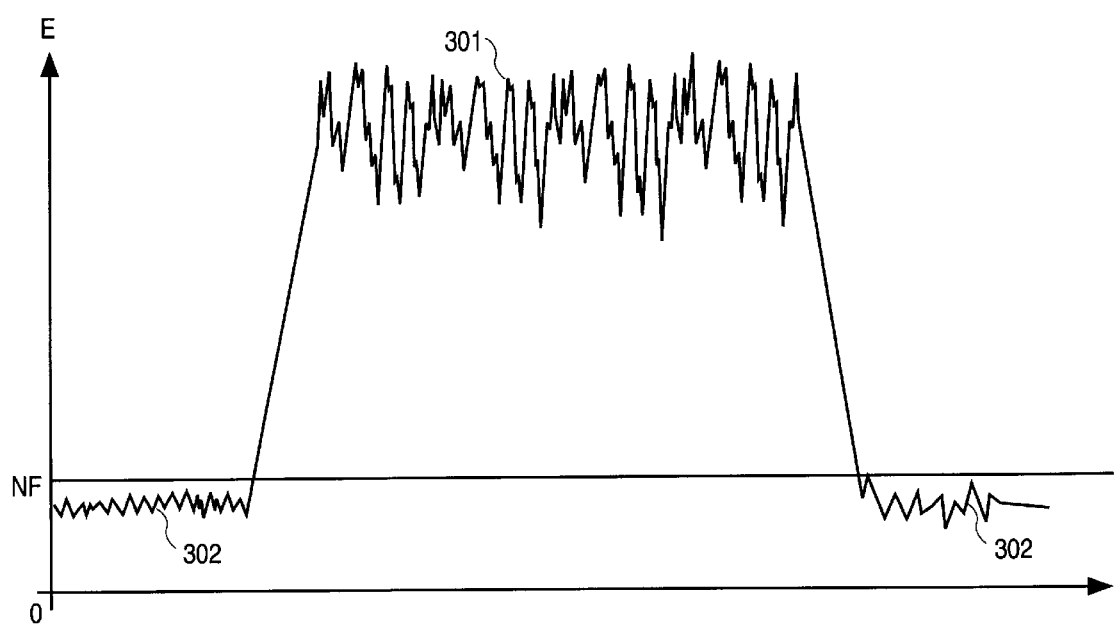
FIG. 3 illustrates a waveform of an audio signal having speech activity.

FIG. 2 illustrates the data flow associated with one embodiment of the present invention. The computer system 1 is configured to include a voice activity detector (VAD) receive channel 210, a VAD transmit channel 211, and an autocalibrator 230, which may be embodied in software stored in memory 40 or in mass storage device 20, in circuitry, or a combination of these elements. Compressed audio data is received by the computer system 1 from the audio channel 95 and then input to decompression unit 220. Signal AUDIO RX, which contains decompressed audio data, is then output by decompression unit 220 to half-duplex receive channel 200 and to VAD receive channel 210. The energy E of the signal AUDIO RX has a waveform similar to that illustrated in FIG. 3. In particular, the portion 301 of the waveform which exceeds a noise floor NF is considered to be speech energy, whereas the portions 302 of the waveform not exceeding the noise floor NF are considered to be only noise energy. The VAD receive channel 210 receives signal AUDIO RX as input and generates an output RXO to half-duplex receive channel 200. The output RXO indicates whether or not the signal AUDIO RX contains speech at any given point in time.

Figure 4A:
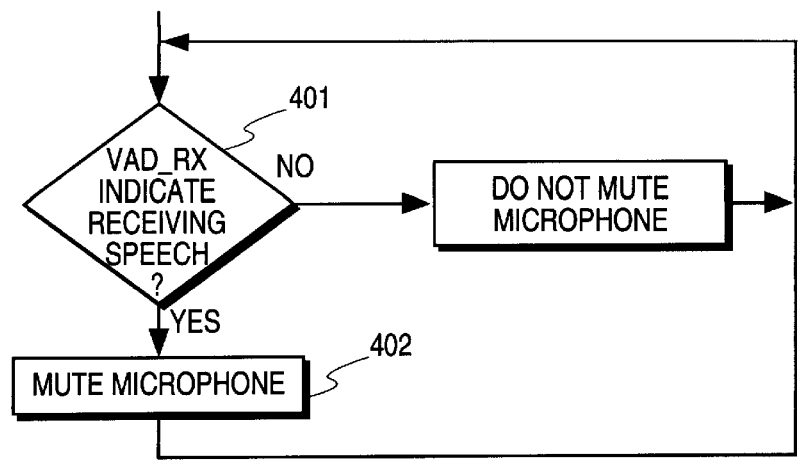
FIGS. 4A and 4B illustrate the function of a voice activity detector (VAD).

In one embodiment, the half-duplex receive channel 200 selectively passes on the signal AUDIO RX to audio front-end output circuitry 252, depending upon the output RXO of the VAD receive channel 210. Audio data passed on to audio front-end (AFE) output circuitry 252 is processed (including digital-to-analog conversion) and sent to the speaker 52. In particular, referring to FIG. 4A, if the VAD receive channel 210 indicates to the half-duplex receive channel 200 that speech is present in the signal AUDIO RX in step 401, then the half-duplex receive channel 200 communicates with half-duplex transmit channel 201 to cause the microphone 53 to be muted in step 402. The microphone 53 remains muted until speech is no longer detected in the signal AUDIO RX.

Figure 4B:
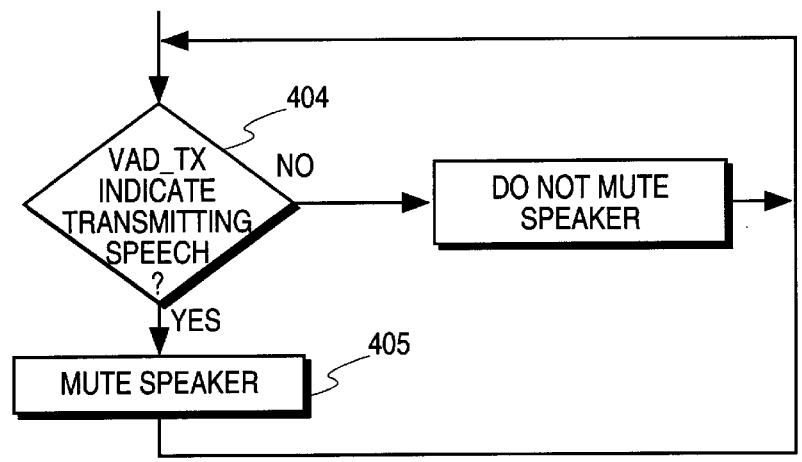

Referring again to FIG. 2, sound to be transmitted across the audio channel 95 is input by a user either through the microphone of the headset 51 or through the open audio microphone 53 into audio front-end input circuitry 253, which includes an analog-to-digital (A/D) converter. Circuitry 253 outputs the digital signal AUDIO TX. The energy E of signal AUDIO TX also has a form similar to that depicted in FIG. 3. The signal AUDIO TX is provided to VAD transmit channel 211 and to half-duplex transmit channel 201. Half-duplex channel 201 selectively passes on the signal AUDIO TX to compression unit 222 for transmission across the audio channel 95, depending upon an input TXO received from the VAD transmit channel 211 indicating whether or not speech is present in signal AUDIO TX. In particular, referring to FIG. 4B, if half-duplex transmit channel 201 receives an input TXO from VAD transmit channel 211 indicating that speech is present in signal AUDIO TX in step 404, then half-duplex transmit channel 201 communicates with half-duplex receive channel 200 to cause the half-duplex receive channel 200 to mute the speaker 52 in step 405. The speaker 52 remains muted until speech is no longer detected in the signal AUDIO TX.

Referring again to FIG. 2, autocalibrator 230 automatically calibrates headset 51 in response to a user input entered through a graphical user interface (GUI) 240 in a manner which is not dependent upon the particular make or model of headset 51. Autocalibrator 230 receives a user input UI from the GUI 240 and the signal TXO from the VAD transmit channel 211. Autocalibrator 230 outputs a first calibration signal CAL1 to the audio front-end input circuitry 253 and a second calibration signal CAL2 to the memory 40 and the mass storage device 20. The signal CAL1 is used to calibrate the audio front end input circuitry 253, and the signal CAL2 is used to store the appropriate hardware settings on the mass storage device 20 or in the memory 40.

Figure 4C:
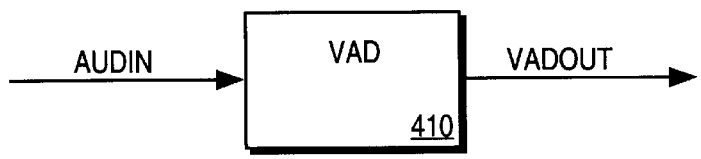
FIG. 4C is a block diagram of a voice activity detector.

Although VAD receive channel 210 and VAD transmit channel 211 have thus far been illustrated and described separately, they perform essentially identical functions. Therefore, VAD receive channel 210 and VAD transmit channel 211 are each hereinafter represented interchangeably by VAD 410 illustrated in FIG. 4C. The VAD 410 receives an input audio signal AUDIN, which represents either signal AUDIO RX or signal AUDIO TX, and outputs a signal VADOUT, which represents either signal RXO or signal TXO and which indicates whether speech is present in the input signal AUDIN.

Figure 5:
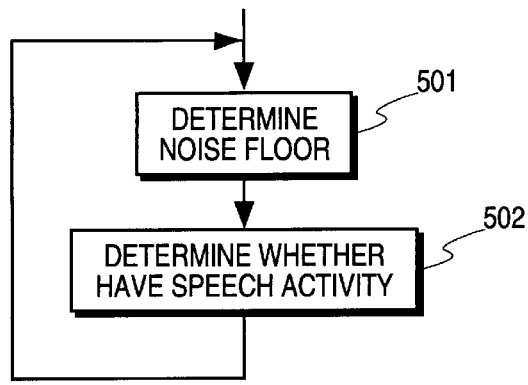
FIG. 5 is a flow diagram illustrating the overall operation of a voice activity detector.

Referring now to FIG. 5, a flow chart is shown illustrating the overall function of the VAD 410. The function of the VAD 410 consists generally of two steps. In step 501, a noise floor NF is established. Next, in step 502, the VAD 410 determines whether speech is present in the input signal AUDIN based upon the relationship of the input signal AUDIN to the noise floor NF. In the preferred embodiment, steps 501 and 502 are each repeated once every 20 milliseconds (msec). The noise floor NF is an adaptive noise floor which is adjusted dynamically as input is received. Thus, the VAD 410 continuously recomputes the noise floor NF in determining whether speech is present in the input signal, as will be described below.

Figure 6:
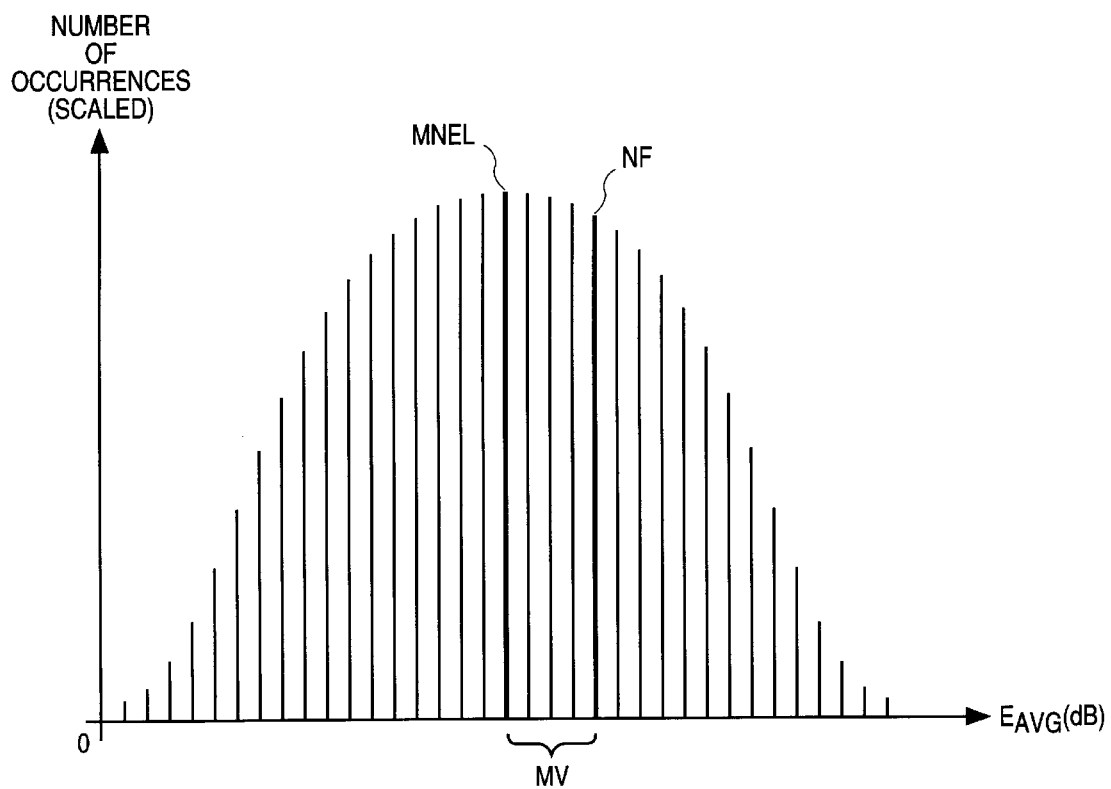
FIG. 6 illustrates a noise power density function.

The noise floor NF is generated based on a noise power density function (NPDF), which is created and continuously updated by the VAD 410. The energy level of the noise floor NF is based upon a current state of the NPDF at any given point and time. FIG. 6 illustrates an NPDF. The noise floor NF is taken to be the mean energy value of the NPDF, i.e., the mean noise energy level (MNEL), plus a margin value MV. In the preferred embodiment, the input signal AUDIN is sampled by the VAD 410 at a rate of 8 kHz and the NPDF is updated every 20 msec. Consequently, the input signal AUDIN is sampled 160 times for every 20 msec time interval.

Figure 9A:
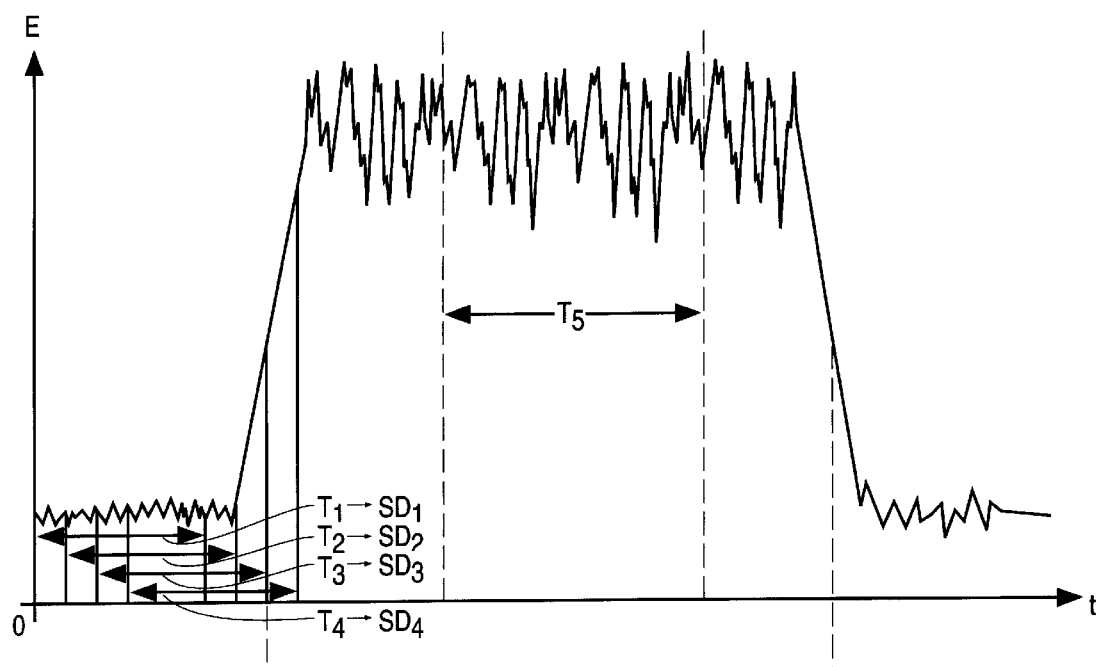
FIG. 9A illustrates an approach to calculating the standard deviation of an audio signal according to the present invention.

To update the NPDF, the VAD 410 uses a measure of the variation of the input signal over a period of time as well as the current energy level of the input signal at a particular point in time. In one embodiment, the measure of variation used is the standard deviation SD of the input signal over a time period. In particular, a "sliding window" of time is used in gathering samples of the input signal's energy to generate each new value of the standard deviation SD. That is, each calculated value of standard deviation SD is based upon a sample period which overlaps at least one previous sample period, as illustrated in FIG. 9A and as will be further discussed below. In one embodiment, a sample period of 500 msec is used to generate each standard deviation value SD. This period of 500 msec is updated every 20 msec in order to achieve a fast response time of the VAD 410. Because such short time periods are used, the current energy level E is examined in comparison to an envelope of the input signal AUDIN as a means of increasing accuracy in updating the noise floor NF, i.e., to reduce the number of instances when low standard deviation speech is incorrectly interpreted as noise. In one embodiment, the envelope of the input signal is an average peak AP of the input signal AUDIN over a two-second time window.

Figure 7:
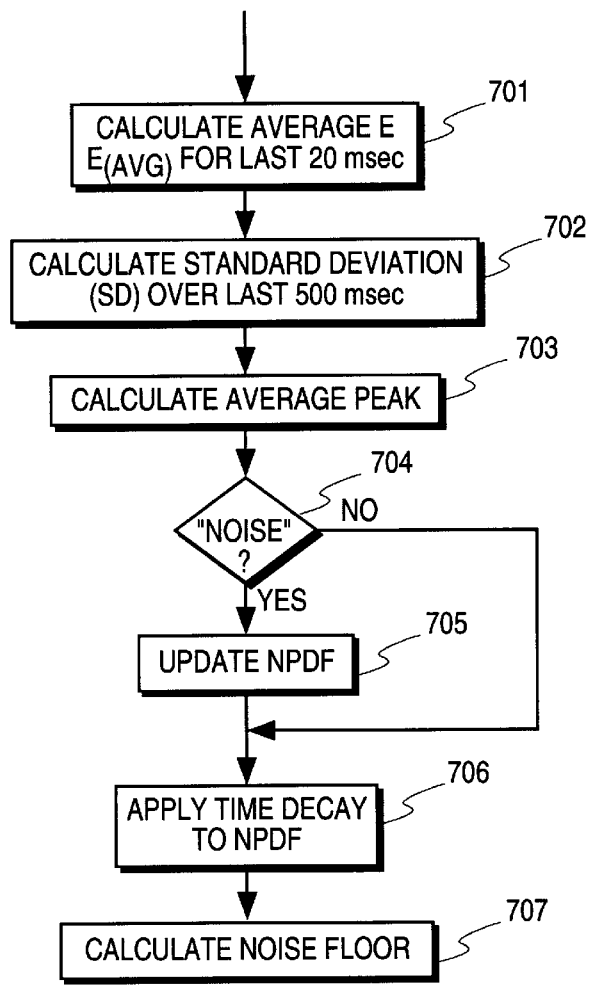
FIG. 7 is a flowchart illustrating a routine for determining and updating a noise floor.

Referring now to FIG. 7, the process of determining and updating the noise floor NF (step 501) is illustrated in greater detail. The process consists of steps 701 through 707. As noted above, the overall function of the VAD 410 is a process which is repeated every 20 msec. Consequently, each of steps 701 through 705 is performed once every 20 msec. The VAD 410 samples the input signal AUDIN at a rate of 8 kH$_z$, or 160 samples for each 20 msec iteration. For each sample, the energy level E of the input signal AUDIN is determined. In step 701, the average energy $E_{AVG}$ is calculated for all samples occurring during the last 20 msec. The average energy $E_{AVG}$ is also referred to as the "frame energy" of a given 20 msec frame (interval). In step 702, the standard deviation SD is calculated for all of the values of frame energy $E_{AVG}$ computed during the last 500 msec. In step 703, the average peak AP of the input signal AUDIN is calculated. In step 704, the VAD makes a preliminary decision as to whether the input signal contains noise only or speech. Note, however, that this preliminary decision is made only for the purpose of updating the noise floor NF and not for the purpose of making a final determination of whether speech is present in the input signal AUDIN. In step 705, the NPDF is updated if the outcome of the preliminary determination was that only noise is present in the input signal (step 704). If it is determined that not only noise is present, the NPDF is not updated. In step 706, a time decay function is applied to the NPDF to eliminate insignificant data points. This step consists of multiplying the entire NPDF curve by a value of 0.99990 resulting in approximately a one-half percent per second decay in each bin (energy value) of the NPDF. The effect of this time decay is that energy values which occur infrequently will eventually disappear from the NPDF or impact the NPDF less heavily than those that occur more frequently. In step 707, the noise floor NF is calculated as the mean energy level of the NPDF plus a margin value MV; that is, the noise floor NF equals the mean noise energy level (MNEL) plus the margin value MV (see FIG. 6). In one embodiment, the margin value MV is 6 dB, however, this value may be tailored to meet desired performance characteristics.

As mentioned above, the noise floor NF is updated based, in part, on the standard deviation SD of samples of the frame energy $E_{AVG}$ of the input signal AUDIN. In particular, during a given time interval, a low standard deviation SD usually indicates a lack of speech activity (i.e., noise only) in the input signal AUDIN, assuming the duration of the sample window is long enough. By contrast, a high standard deviation in signal energy usually indicates that speech activity is present in the input signal. The standard deviation SD is computed according to equation (1).

$$SD = \sqrt{\frac{\sum_{i=1}^{n}(E_i - \bar{E}_i)^2}{n-1}} \quad (1)$$

where $\bar{E}hd\,i$represents values of frame energy $E_{AVG}$.

Figure 8:
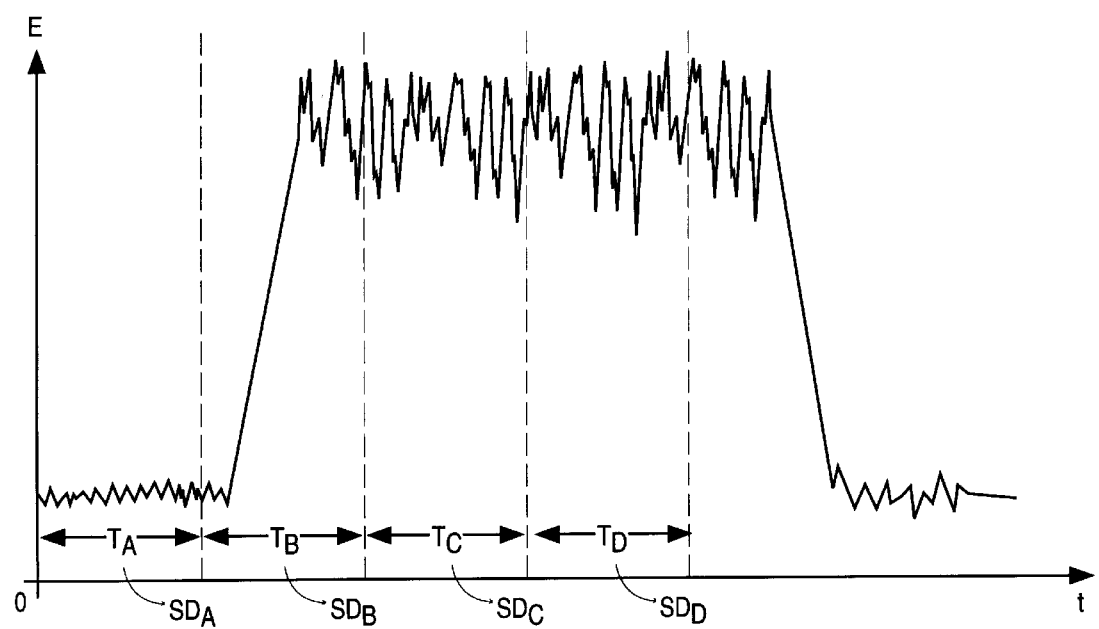
FIG. 8 illustrates an approach to calculating the standard deviation of the energy of an input audio signal.

A new standard deviation value SD is calculated every 20 msec for the purpose of updating the NPDF. The standard deviation SD is calculated for all values of frame energy $E_{AVG}$ occurring within the last 0.5 seconds. Referring to FIG. 9A, overlapping time intervals $T_1$ through $T_4$ are examples of four sample windows that are used to generate four consecutive standard deviation values, $SD_1$ through $SD_4$, respectively. Because a new value of standard deviation SD is calculated every 20 msec to update the noise floor NF, time intervals $T_1$ through $T_4$ are offset by increments of 20 msec. This method of calculating standard deviation SD differs from one prior art method, illustrated in FIG. 8, in which non-overlapping time intervals $T_A$ through $T_D$ are used to generate standard deviation values $SD_A$ through $SD_D$.

Figure 9B:
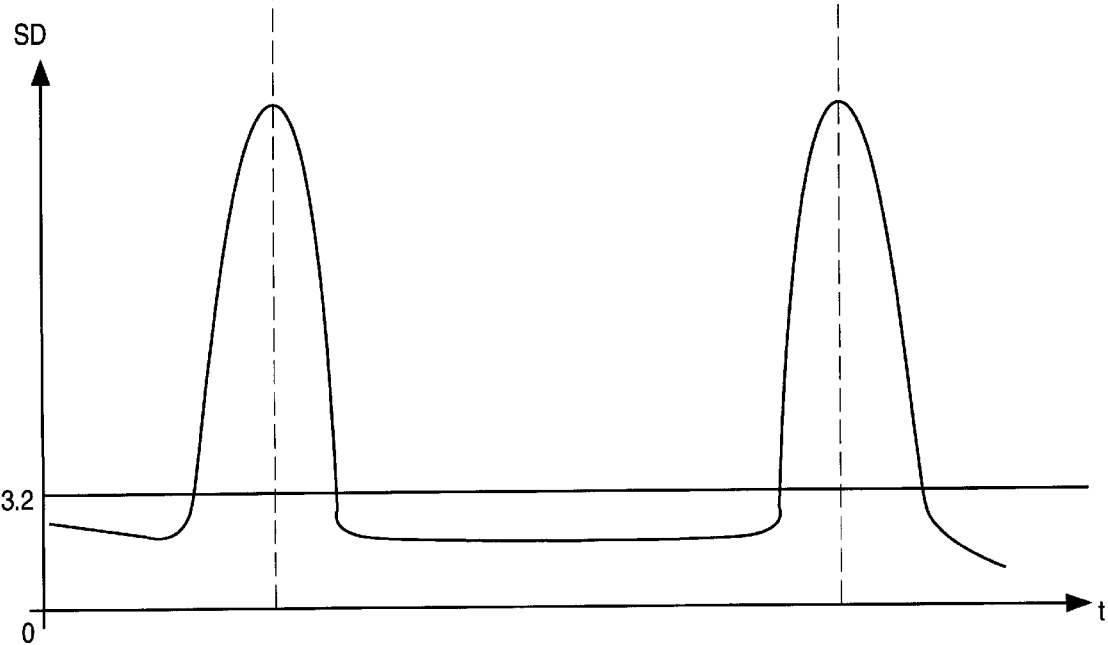
FIG. 9B illustrates a plot of the standard deviation of an input audio signal over time.

As noted above, the time interval of 500 msec used in one embodiment to calculate the standard deviation SD is relatively short, in view of the dynamic characteristics of typical human speech. During a given 500 msec time period of continuous human speech, the standard deviation SD of the signal energy may be quite low and possibly below whatever threshold value is being used. As the duration of the sample window for calculating standard deviation SD is reduced, the likelihood of misclassifying speech as noise tends to increase. This principle is illustrated in FIG. 9B, which shows a plot of standard deviation SD over time for the waveform shown in FIG. 9A.

Figure 10:
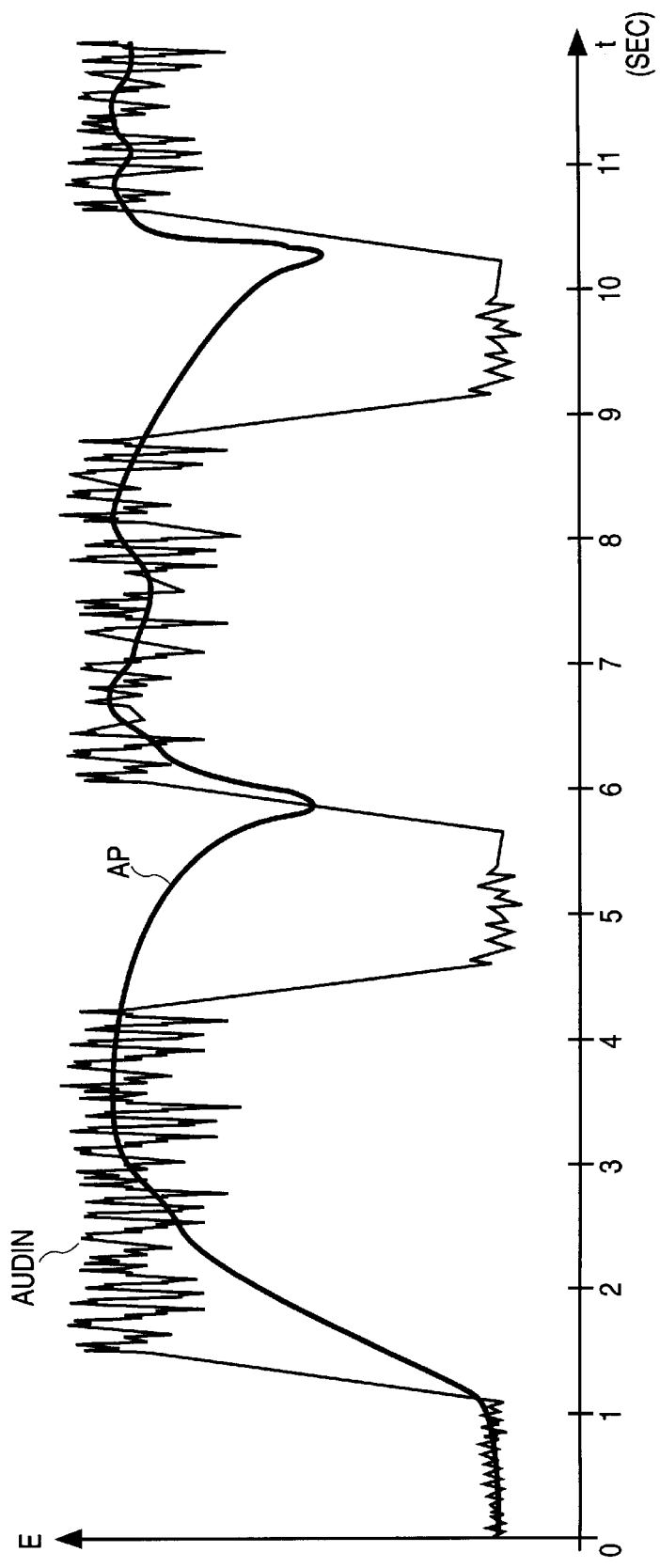
FIG. 10 illustrates a waveform of an input audio signal and a plot of the average peak of the input audio signal.

In one embodiment, a standard deviation SD value of 3.2 is used as a threshold value in distinguishing speech from noise for the purpose of updating the NPDF. In FIGS. 9A and 9B, it can be seen that speech occurring during the time interval $T_5$ might be misclassified as noise if one relied only upon the standard deviation SD, since that value falls below 3.2 during the time interval $T_5$. Consequently, the present invention does not rely only upon the standard deviation SD of the input signal in classifying the input audio signal; instead, the present invention also computes an envelope of the input signal AUDIN during every 20 msec iteration as an additional factor in updating the NPDF. This envelope is represented by the average peak AP of the energy of the input signal AUDIN, as illustrated in FIG. 10.

Figure 11:
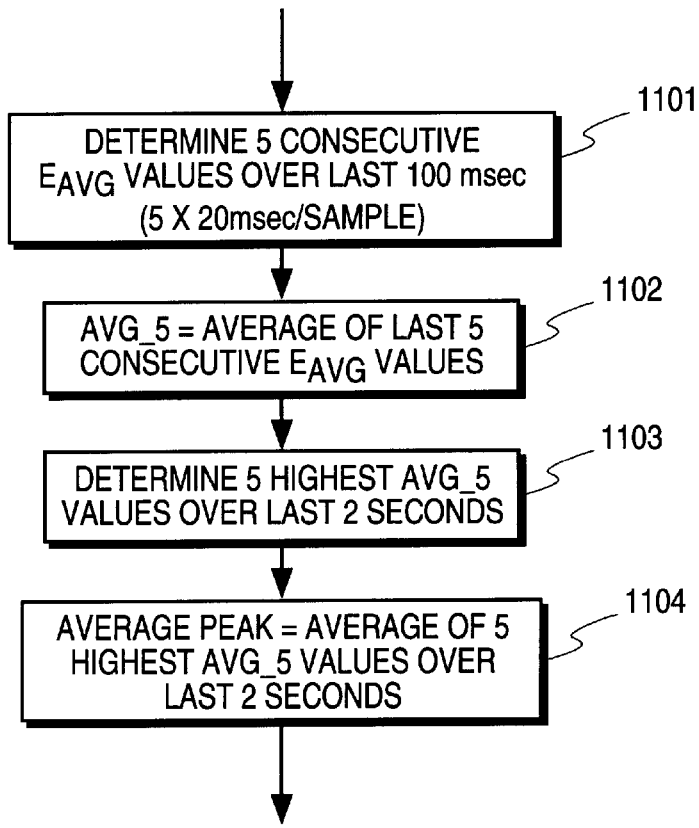
FIG. 11 is a flow diagram illustrating a routine for calculating an average peak of an input audio signal.

FIG. 11 illustrates how the average peak AP is calculated. In step 1101, the last five consecutive frame energy values $E_{AVG}$ (corresponding to the last 100 msec) are saved. These five $E_{AVG}$ values are then averaged in step 1102 to produce a value $AVG_5$. In step 1103, the highest five values of $AVG_5$ calculated during the last two seconds are identified. In step 1104, the average peak AP is calculated to be the average of these five highest $AVG_5$ values.

Referring again to FIG. 7, a preliminary determination of whether or not the input signal includes speech is made in step 704 for the limited purpose of updating the NPDF (step 705) to update the noise floor NF (step 707). As already mentioned, the average peak AP is used, in part, to increase accuracy during time periods in which the standard deviation value falls below of 3.2 even though speech is occurring. Specifically, the input signal AUDIN will not be considered as containing only noise unless the current value of frame energy $E_{AVG}$ falls below the level of the current average peak AP minus 9 dB. Hence, an input signal AUDIN that has a low standard deviation SD but a high current frame energy $E_{AVG}$ is not likely to be misclassified as noise for the purpose of updating the NPDF. In addition, the present invention also employs a "zero-crossing" algorithm to further increase the accuracy of the noise floor, as discussed below.

The process of determining whether the input signal contains only noise (step 704) and updating the NPDF (step 705) can be summarized as follows. The NPDF is updated based upon both the relationship between the current frame energy value $E_{AVG}$ of the input signal to the current average peak AP as well as the standard deviation SD of the input signal energy over a given time period. Bins of the NPDF are increased by either a high confidence value or a low confidence value to reflect the degree of confidence that the input signal AUDIN currently contains only noise.

Figure 12:
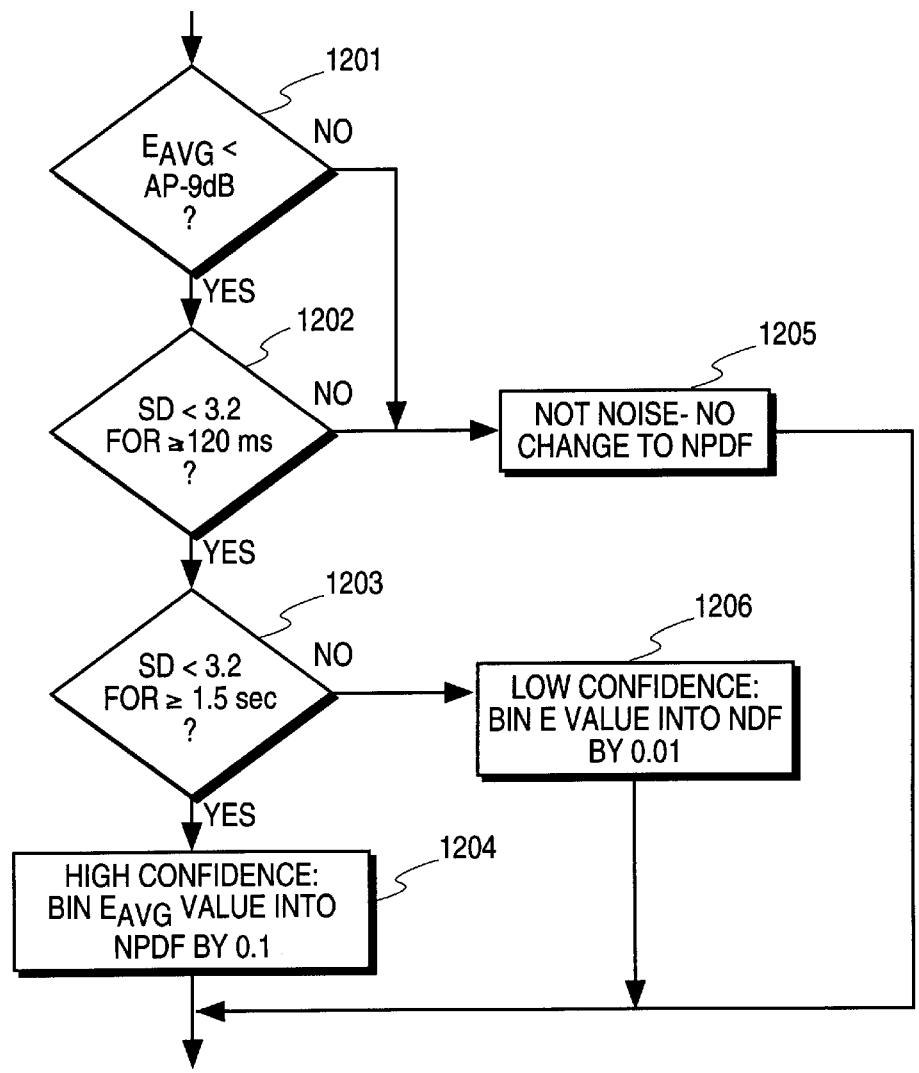
FIG. 12 is a flow diagram illustrating a routine for determining whether an input signal contains only noise and updating a noise power density function.

FIG. 12 illustrates in detail a routine for determining whether the input signal contains only noise (step 704) and updating the NPDF (step 705). In step 1201, if the current frame energy $E_{AVG}$ does not fall below the level (AP−9 dB), then it is determined in step 1205 that the input signal AUDIN is not noise for the purpose of updating the NPDF; in that case, no bin of the NPDF is increased. If, however, it is determined in step 1201 that the current frame energy $E_{AVG}$ does fall below (AP−9 dB), then a determination is made in step 1202 of whether all of the standard deviation values SD calculated during the last 120 msec have fallen below 3.2. If the outcome of step 1202 is "NO", then it is determined in step 1205 that the input signal AUDIN is not noise for the purpose of updating the NPDF, and no bin of the NPDF is increased. If all of the standard deviation values SD have fallen below 3.2 for at least the last 120 msec, then a determination is made in step 1203 of whether all of the standard deviation values SD have fallen below 3.2 for at least the last 1.5 seconds. If the outcome of step 1203 is "NO", then there is "low confidence" that the input signal AUDIN contains only noise. Consequently, in step 1206 the appropriate bin of the NPDF is updated by increasing that bin by a low confidence value of 0.01. If, however, in step 1203 the standard deviation SD has fallen below 3.2 for at least 1.5 seconds (and the outcomes of steps 1201 and 1202 was "YES"), then there is "high confidence" that the input signal AUDIN is noise only. In that case, the appropriate bin of the NPDF is increased by a high confidence value of 0.1 in step 1204. Note that it is not necessary to use the exact values of 0.01 as the low confidence value and 0.1 as the high confidence value in order to practice the present invention. The important aspect of these numbers is that the ratio of the high confidence value to the low confidence value is substantially greater than one.

Figure 13:
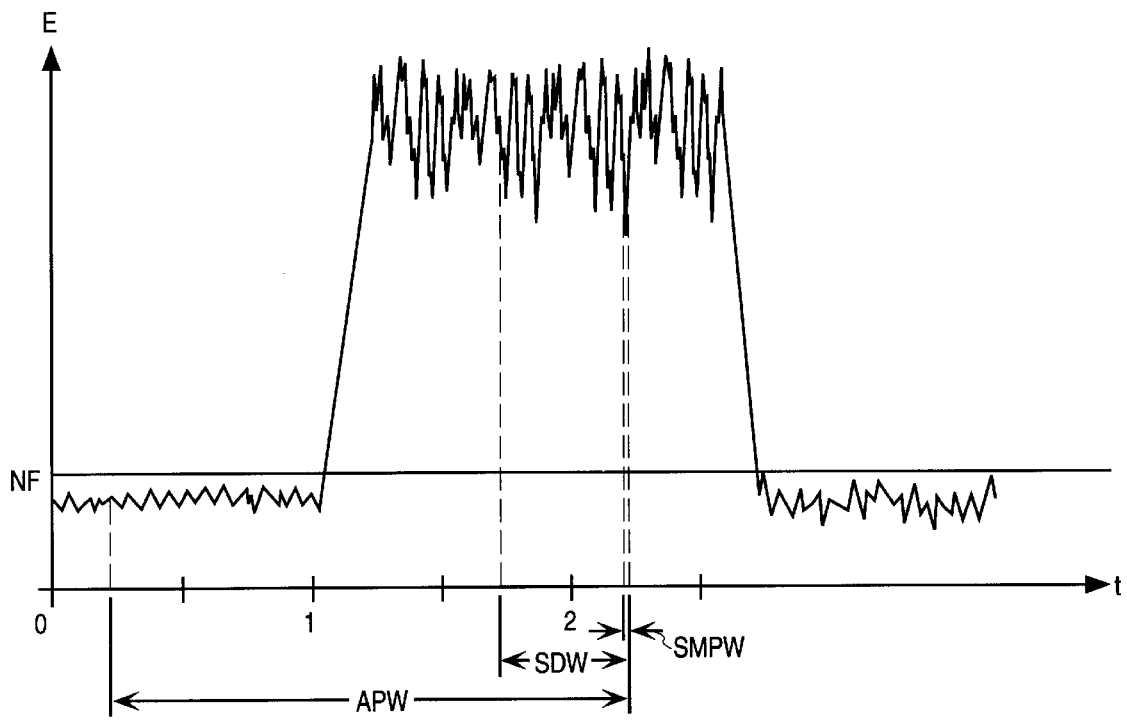
FIG. 13 illustrates a waveform of an input audio signal showing a comparison of the sample windows used in calculating average energy, standard deviation, and average peak of the input audio signal.

FIG. 13 shows an example of a waveform of the audio input signal AUDIN and the relationships between the sample windows used in calculating the frame energy $E_{AVG}$, the standard deviation SD, and the average peak AP. In FIG. 13, a frame energy value $E_{AVG}$ is calculated for samples of instantaneous energy E occurring within a 20 msec sample window SMPW. A standard deviation SD value is also calculated based upon values of $E_{AVG}$ calculated during the 0.5 second standard deviation window SDW. In addition, a new value of average peak AP is calculated based upon values of $E_{AVG}$ occurring during the two-second sample window APW. This process is repeated every 20 msec, with the sample windows SMPW, SDW, and AP being advanced by 20 msec for each repetition.

Figure 14:
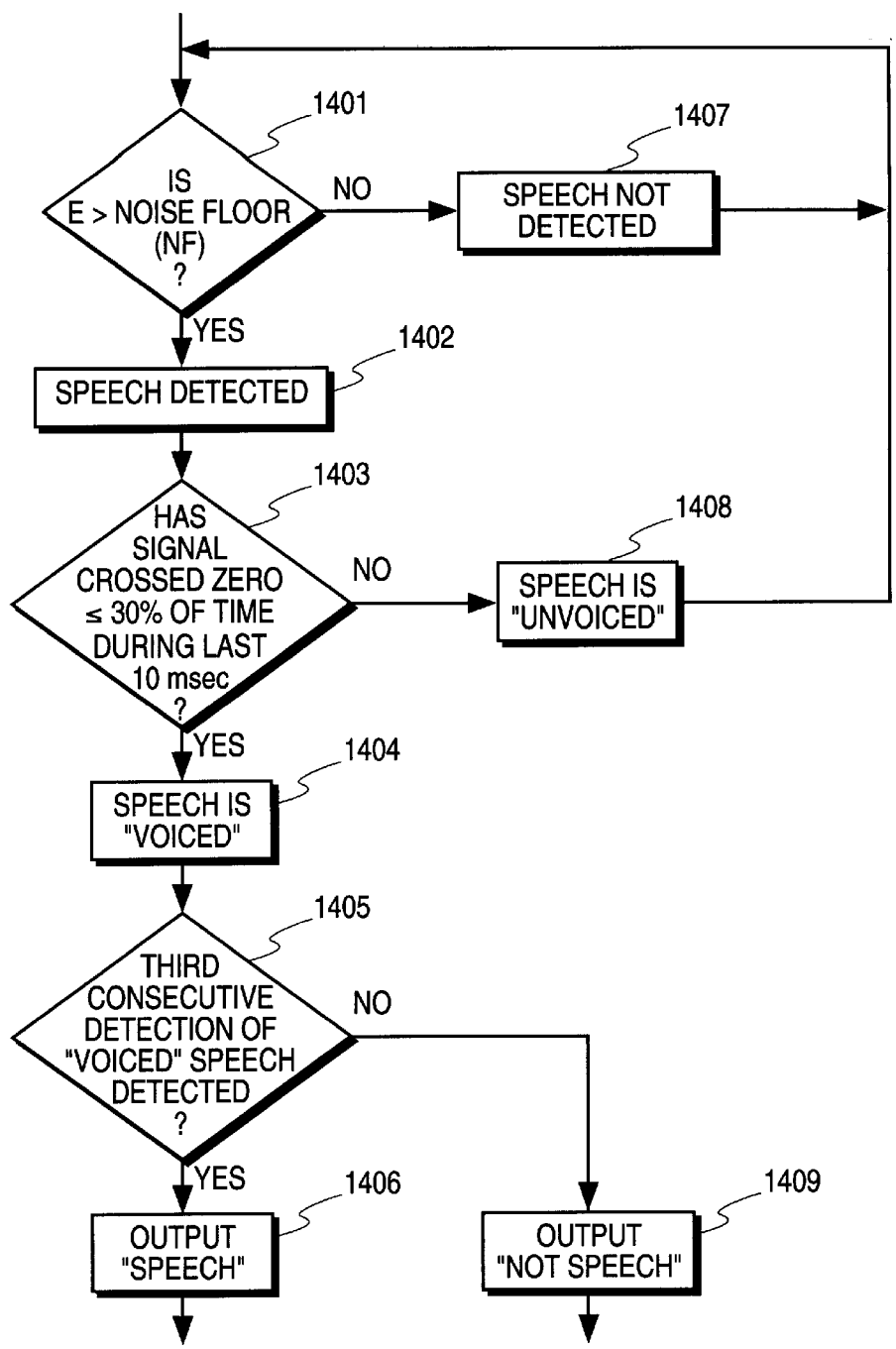
FIG. 14 is a flow diagram illustrating a routine for determining whether speech is present in an input audio signal.

The final decision made by the VAD 410 on whether the input signal AUDIN contains speech for a given sample period is indicated in the output signal VADOUT, which can be used to selectively mute the speaker 52 or the microphone 53 during open audio communication, based upon the current instantaneous energy E of the input signal relative to the noise floor NF. This decision-making process is illustrated in FIG. 14. In step 1401, a determination is made of whether the instantaneous energy E of the input signal AUDIN exceeds the noise floor NF. If not, then in step 1407 the VAD 410 makes the preliminary decision that speech is not detected in the input signal If the instantaneous energy E exceeds the noise floor NF, then the VAD 410 makes the preliminary decision in step 1402 that speech is detected in the input signal AUDIN. If speech is detected in step 1402, a "zero-crossing" test is applied in step 1403 to determine whether the speech is "voiced" or "unvoiced" speech. "Voiced" speech is speech produced by vocal chord movement (e.g., the sound of the letter "a"), whereas "unvoiced" speech is speech produced without vocal chord movement (e.g., the sound of the letters "sh"). The zero-crossing test of step 1403 is a determination of whether the raw signal value of the signal AUDIN has changed sign more than 30 percent of the time during the last 10 msec. The outcome of the zero-crossing test (step 1403) is used by the autocalibrator 230 to adjust the hardware settings associated with the microphone 53. The final decision made by the VAD is "smoothed" by 60 msec. That is, three consecutive detections of speech corresponding to three consecutive 20 msec time intervals must occur in steps 1402 through 1404 for the VAD 410 to generate an output VADOUT indicating that speech is present (steps 1405, and 1406). If the outcome of step 1403 is "no", then it is determined in step 1408 that the detected speech is "unvoiced" speech. Otherwise, it is determined in step 1404 that the detected speech is "voiced" speech.

Figure 15:
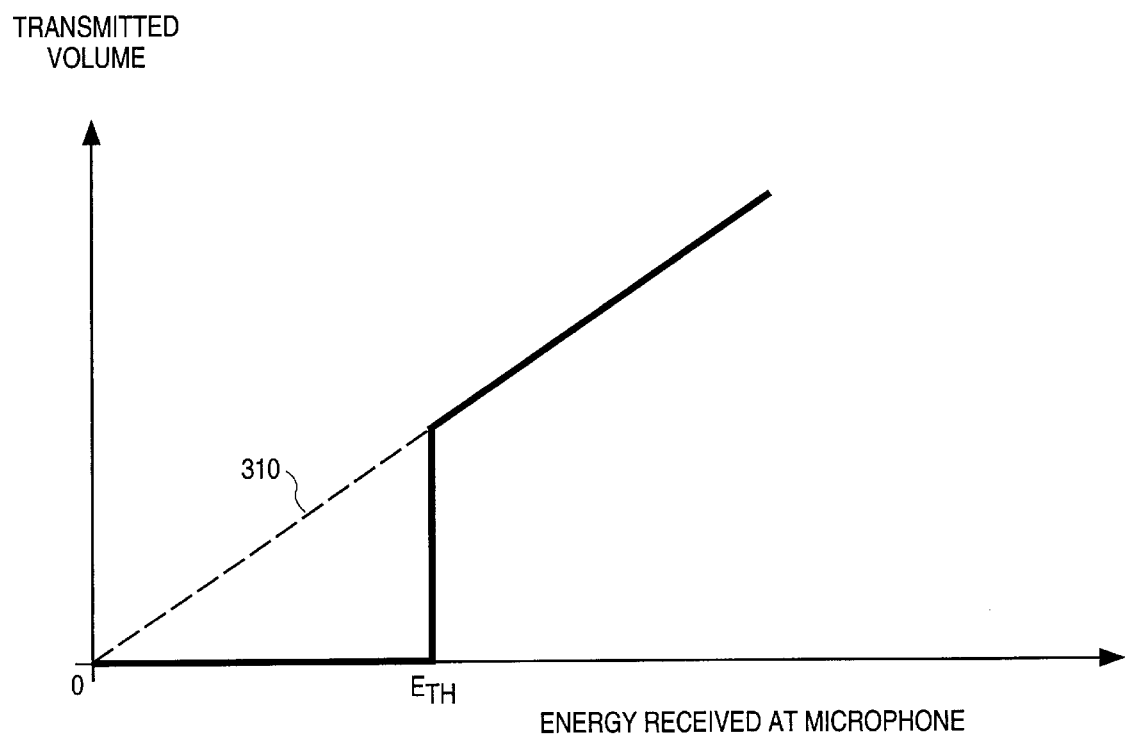
FIG. 15 illustrates the effect of a gating function attenuating an audio signal.

Another aspect of the present invention pertains to a technique for suppressing noise in the audio channel of a video conferencing system. As previously noted, one problem associated with multi-point videoconferencing is that noise introduced into the audio signal tends to degrade the quality of the transmitted audio signal and cause ear fatigue and annoyance to the listener. One potential solution to this problem is to apply an audio gating function, an example of which is illustrated in FIG. 15. In the gating function of FIG. 15, the audio signal that is to be transmitted over the audio channel 95 is completely suppressed until the input energy received at the microphone reaches some threshold level $E_{TH}$. Once the input energy reaches the threshold level $E_{TH}$, the input audio signal is passed through to the output, without attenuation. Hence, in the gating function of FIG. 15, the transmitted volume is at a minimum level until the input energy reaches $E_{TH}$, at which time the transmitted volume begins to coincide with line 310. Line 310 represents a normalized set of points at which the transmitted volume directly reflects (represents) the energy received at the microphone.

As noted above, a disadvantage of gating is that a sudden transition between two different levels of attenuation is often perceivable and distracting to the user. Furthermore, certain existing noise suppression solutions do not adapt to changes in the noise level. The present invention overcomes these and other disadvantages. In particular, the present invention provides smooth transitions in the output volume when the input changes from the absence of speech to the presence of speech, and vice versa, while dynamically adapting to the noise level, as will now be described. Further, because noise suppression in accordance with the present invention is not processor-intensive, multiple instantiations of the technique can be performed at relatively high speed. Therefore, noise suppression in accordance with the present invention is well-suited to the mixing of multiple audio streams, such as may be performed during multi-point conferencing. Moreover, noise suppression in accordance with the present invention does not cause the distortion of voice that is associated with certain noise cancellation techniques.

Figure 16:
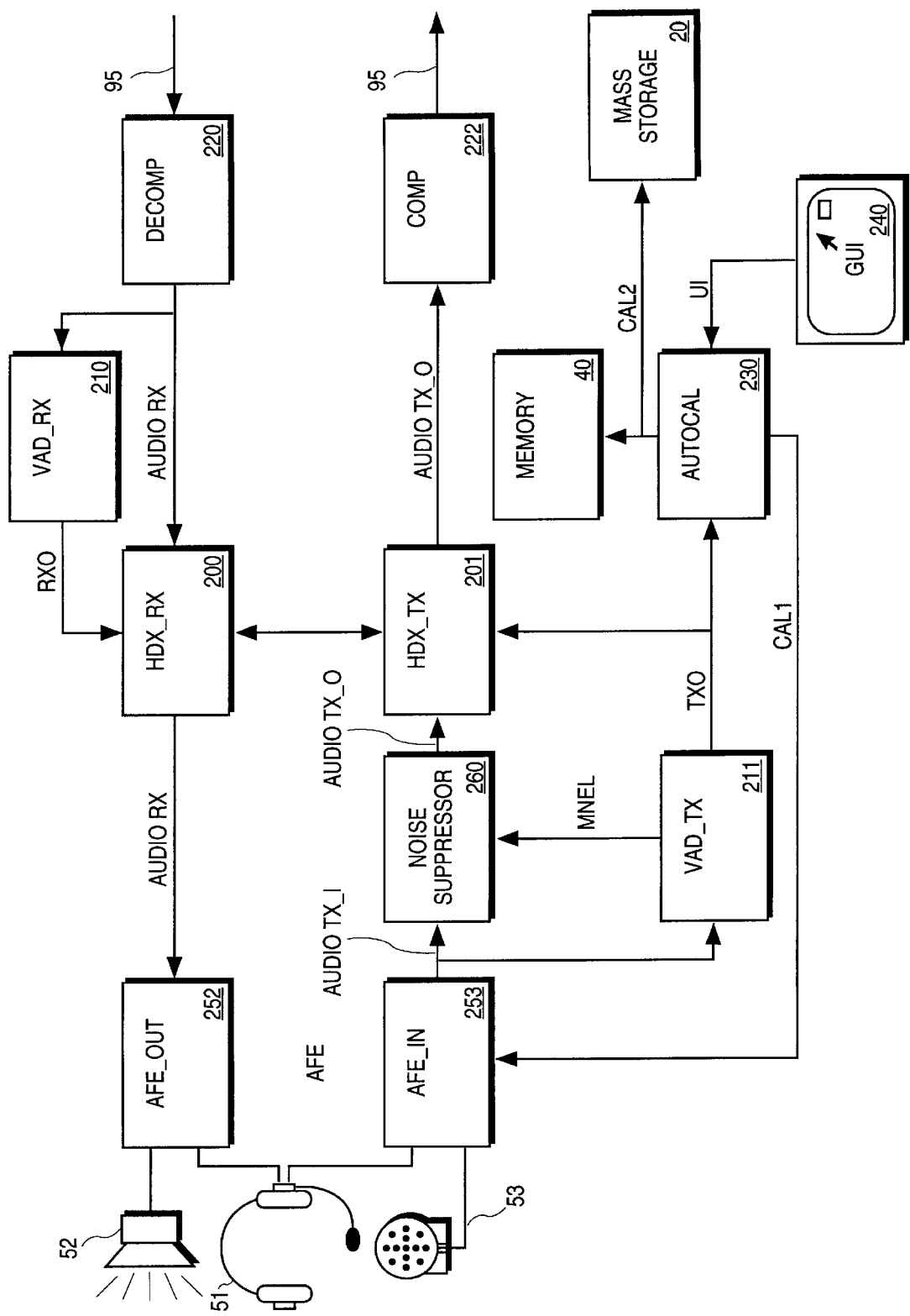
FIG. 16 is a block diagram illustrating the data flow associated with an embodiment which includes a noise suppressor.

FIG. 16 illustrates data flow associated with noise suppression according to one embodiment of the present invention. Note that although FIG. 16 illustrates data 15 flow within an audio endpoint, noise suppression can also be implemented within an MCU (see FIG. 1B). The signal AUDIO TX that is output from audio front-end input circuitry 253 in FIG. 1B is replaced in FIG. 16 by signal AUDIO TX_I, which is applied to the input of a noise suppressor 260. The noise suppressor 260 outputs a modified signal AUDIO TX_O to the half-duplex transmit channel 201. The noise suppressor 260 also receives a signal MNEL from the VAD transmit channel 211, which specifies the current mean noise energy level MNEL. The signal AUDIO TX_O represents the signal AUDIO TX_I after application of an attenuation function.

In one embodiment of the present invention, the noise suppressor 260 attenuates the input signal AUDIO TX_I by applying an approximation of an exponential attenuation function to signal AUDIO TX_I within a certain range of input signal values. As illustrated in FIG. 20B, the application of an attenuation function in accordance with the present invention results in an approximately exponential increase, within a limited range of input energies, in the transmitted volume as input energy increases. The application of an attenuation function in accordance with the present invention differs from the gating approach described in connection with FIG. 15, which is characterized by an abrupt transition in attenuation from full attenuation to no attenuation when the input energy reaches the threshold level $E_{TH}$.

Consequently, the present invention provides a smoother transition in the volume of the output signal AUDIO TX_O as the volume of the input signal AUDIO TX_I changes, in comparison to the gating method. More importantly, the present invention provides a smoother transition in the output volume when the input changes from the absence of speech to the presence of speech, and vice versa.

The noise suppressor 260 also attenuates the signal AUDIO TX_I as a function of the dynamically determined noise level computed by the VAD transmit channel 211. More specifically, the signal AUDIO TX_I is attenuated at a given point in time according to the relationship between its current energy level and the current mean noise energy level, MNEL. In addition, the output of noise suppressor 260 is throttled, so that changes in the energy level of input signal AUDIO TX_I are not instantaneously reflected in the output signal AUDIO TX_O. This throttling function serves to further reduce certain perceivable effects that are normally associated with gating.

Figure 17:
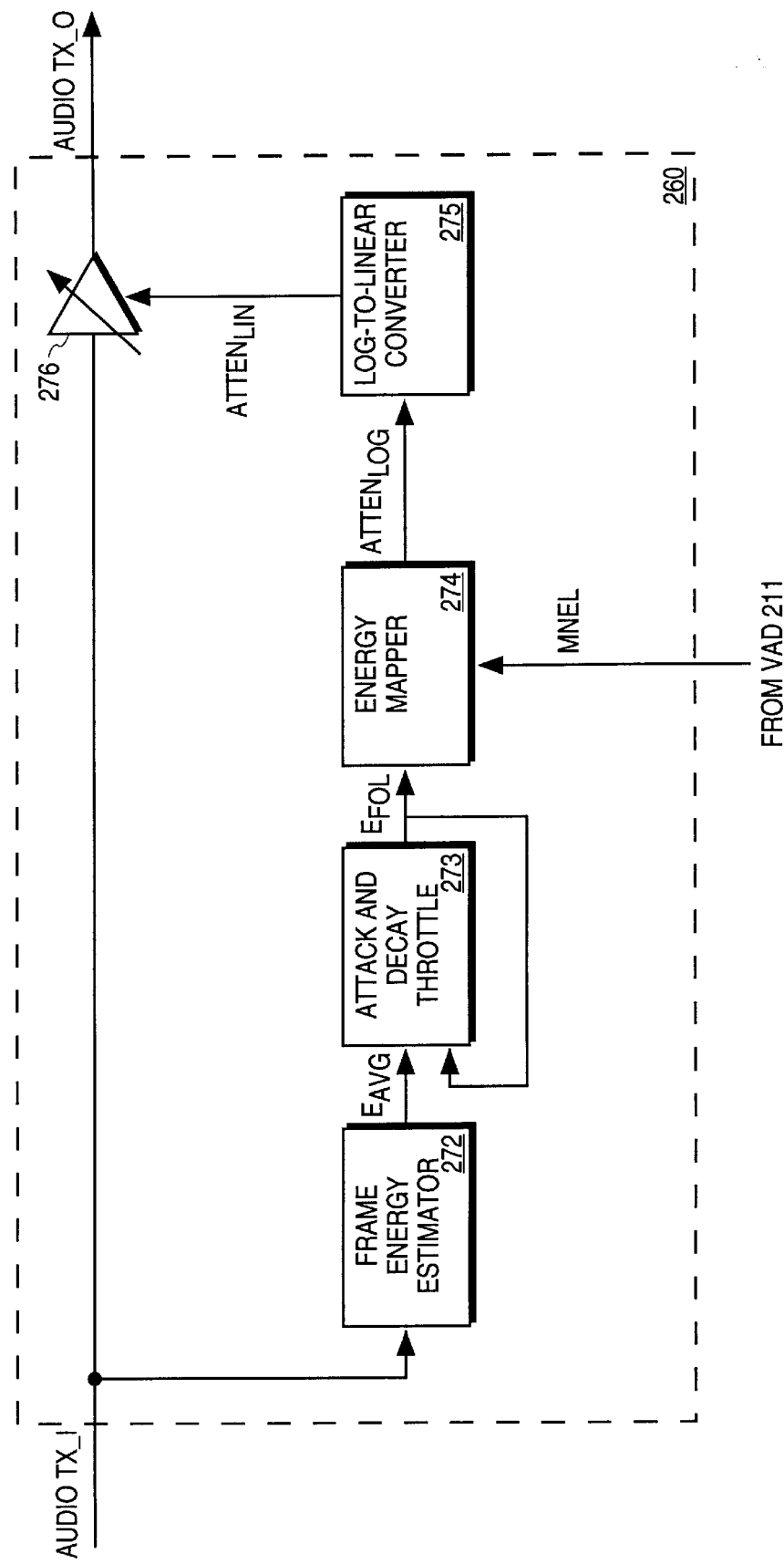
FIG. 17 is a block diagram of a noise suppressor.

FIG. 17 illustrates the data flow associated with the noise suppressor 260. The noise suppressor computes the amount of attenuation for signal AUDIO TX_I every five msec. The noise suppressor 260 includes a frame energy estimator 272, an attack and decay throttle 273, an energy mapper 274, a log-to-linear converter 275, and an attenuator 276. The attenuator 276 receives the signal AUDIO TX_I as input and outputs the signal AUDIO TX_O. The attenuator 276 is a variable attenuator which attenuates signal AUDIO TX_I according to a signal $ATTEN_{LIN}$ received from log-to-linear converter 275.

Signal AUDIO TX_I is applied as input to frame energy estimator 272. Frame energy estimator 272 computes the frame energy $E_{AVG}$ for each 20 msec window. The frame energy $E_{AVG}$ is provided as output to the attack and decay throttle 273. The attack and decay throttle 273 outputs a follower energy signal $E_{FOL}$, which is an energy value that tracks (follows) the current frame energy $E_{AVG}$. The value of the follower energy signal $E_{FOL}$ is used by the energy mapper 274 to determine a logarithmic attenuation value $ATTEN_{LOG}$ (specified in dB) every five msec. Log-to-linear converter 275 receives the logarithmic attenuation value $ATTEN_{LOG}$ and converts it to a linear attenuation value $ATTEN_{LIN}$. The value $ATTEN_{LIN}$ is applied to variable attenuator 276 to determine the actual attenuation of signal AUDIO TX_I, as noted above.

As will be described in greater detail below, the value of follower energy signal $E_{FOL}$ responds to changes in the frame energy $E_{AVG}$ by moving toward the current value of the frame energy $E_{AVG}$ (i.e., by following the value of the current frame energy $E_{AVG}$). The rate at which signal $E_{FOL}$ moves toward the value of $E_{AVG}$ depends upon whether $E_{AVG}$ exceeds $E_{FOL}$ (which is referred to as the "attack" situation) or $E_{FOL}$ exceeds $E_{AVG}$ (which is referred to as the "decay" situation). In one embodiment, the follower energy signal $E_{FOL}$ decays (decreases) through a full range in 75±5 msecs, whereas the follower energy signal $E_{FOL}$ attacks (increases) through the full range in 20+5 msecs. The follower energy value $E_{FOL}$ is recomputed every five msecs. Therefore, the current output of the attack and decay throttle 273 for a given point in time is designated $E_{FOL}[n]$. The value of $E_{FOL}[n]$ is computed based upon the previously computed value of follower energy, $E_{FOL}[n-1]$, as will now be described.

The value of $E_{FOL}[n]$ is computed as $E_{FOL}[n-1]$ adjusted by a scaled error value, which may be positive or negative. The sign of the error value at any given point in time depends upon whether the current frame energy $E_{AVG}$ is greater than the previous follower energy value $E_{FOL}[n-1]$, which is defined as the "attack" situation, or less than the previous follower energy value $E_{FOL}[n-1]$, which is defined as the "decay" situation. Thus, the current follower energy value $E_{FOL}[n]$ will be computed as the previous follower energy value $E_{FOL}[n-1]$, plus or minus some value, depending upon whether the current situation is attack or decay, respectively.

Before the error value is used to compute the current follower energy value $E_{FOL}[n]$, however, it is scaled by a scaling factor UPDATE_WEIGHT, the value of which depends upon whether the current situation is attack or decay. The scaling factor UPDATE_WEIGHT is used to control the maximum amount by which the signal $E_{FOL}[n]$ can change from one computation to the next. Essentially, the scaling factor UPDATE_WEIGHT is a dampening factor applied to $E_{FOL}[n]$. UPDATE_WEIGHT is assigned a value ATTACK_WEIGHT during an attack situation and a value DECAY_WEIGHT in a decay situation. In one embodiment, ATTACK_WEIGHT equals 0.25 to achieve the desired attack rate, while DECAY_WEIGHT equals 0.067 to achieve the desired decay rate.

Figure 18:
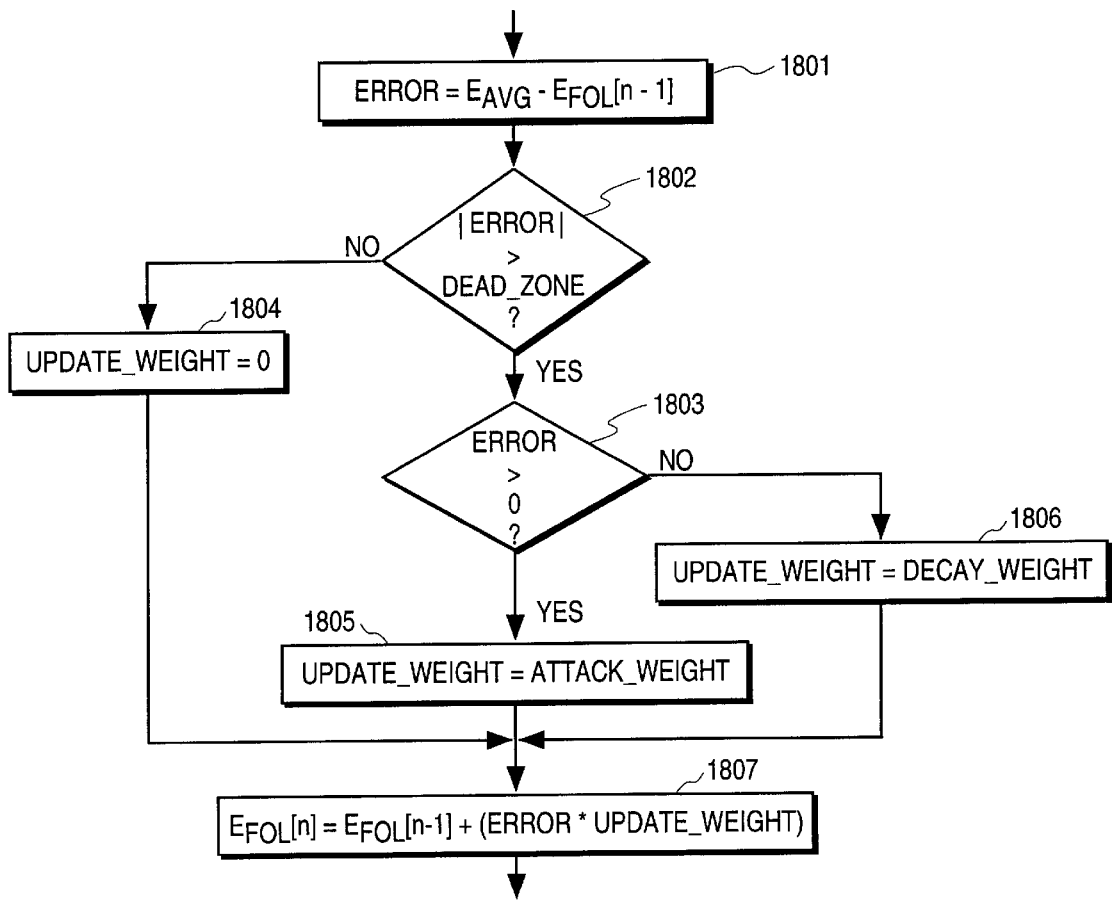
FIG. 18 is a flow diagram illustrating a routine in a noise suppressor for determining attack and decay throttle values.

FIG. 18 illustrates the operation of the attack and decay throttle 273. In step 1801, a value, ERROR, is taken to be the frame energy $E_{AVG}$ for the current 20 msec window, minus the most-recently computed follower energy value $E_{FOL}[n-1]$. If the magnitude of ERROR (i.e., |ERROR|) is greater than a value, DEAD_ZONE, in step 1802, and ERROR is a positive value in step 1803, then the signal $E_{FOL}$ is considered to be in the attack situation; consequently, the scaling factor UPDATE_WEIGHT is assigned in step 1805 the appropriate value for the attack situation (i.e, ATTACK_WEIGHT). If the magnitude of ERROR is greater than the value DEAD_ZONE in step 1802, but ERROR is non-positive, then in step 1806, UPDATE_WEIGHT is assigned the appropriate value for the decay situation (i.e., DECAY_WEIGHT). If the magnitude of ERROR is less then or equal to the value DEAD_ZONE in step 1802, then UPDATE_WEIGHT is set equal to zero in step 1804. Once UPDATE_WEIGHT is computed, then in step 1807 the current follower energy $E_{FOL}[n]$ is computed according to equation (2).

$$E_{FOL}[n] = E_{FOL}[n-1] + (ERROR * UPDATE\_WEIGHT) \qquad (2)$$

The value DEAD_ZONE is used to provide steady-state stability to the output of the attack and decay throttle 273. In particular, the purpose of the value DEAD_ZONE is that minor fluctuations in the frame energy value $E_{AVG}$ relative to the current follower energy value $E_{FOL}[n]$ will cause no change in the output $E_{FOL}[n]$. The value DEAD_ZONE corresponds to a narrow energy range around the current value of signal $E_{FOL}[n]$. If the frame energy $E_{AVG}$ falls within this narrow range in step 1802 (i.e., if |ERROR|<DEAD_ZONE), then the value $E_{FOL}[n]$ is not changed, because there has not been a sufficient amount of change in the input signal to cause a change to $E_{FOL}[n]$. That is, if the magnitude of the value ERROR does not exceed the value DEAD_ZONE, it is determined that the follower energy signal $E_{FOL}$ is in neither attack nor decay; hence, UPDATE_WEIGHT will be set equal to zero.

Hence, the attack and decay throttle 273 outputs a follower energy value $E_{FOL}$, which follows the current frame energy $E_{AVG}$. The scaling factor UPDATE_WEIGHT determines the variable throttling effect by regulating the amount by which the follower energy $E_{FOL}$ changes for a given change in the frame energy $E_{AVG}$.

Referring again to FIG. 17, the follower energy $E_{FOL}$ is input to the energy mapper 274, which maps the follower energy $E_{FOL}$ to a logarithmic attenuation value $ATTEN_{LOG}$. This mapping is performed by the energy mapper 274 based on the relationship between the current follower energy value $E_{FOL}[n]$ and the mean noise energy level, MNEL. Recall that the MNEL is computed dynamically in response to the input signal AUDIO TX_I, as described above. In one embodiment, the function of the energy mapper 274 is implemented using a look-up table. In particular, attenuation values $ATTEN_{LOG}$ for various input values $E_{FOL}$ are provided in a look-up table and retrieved when needed.

Figure 20A:
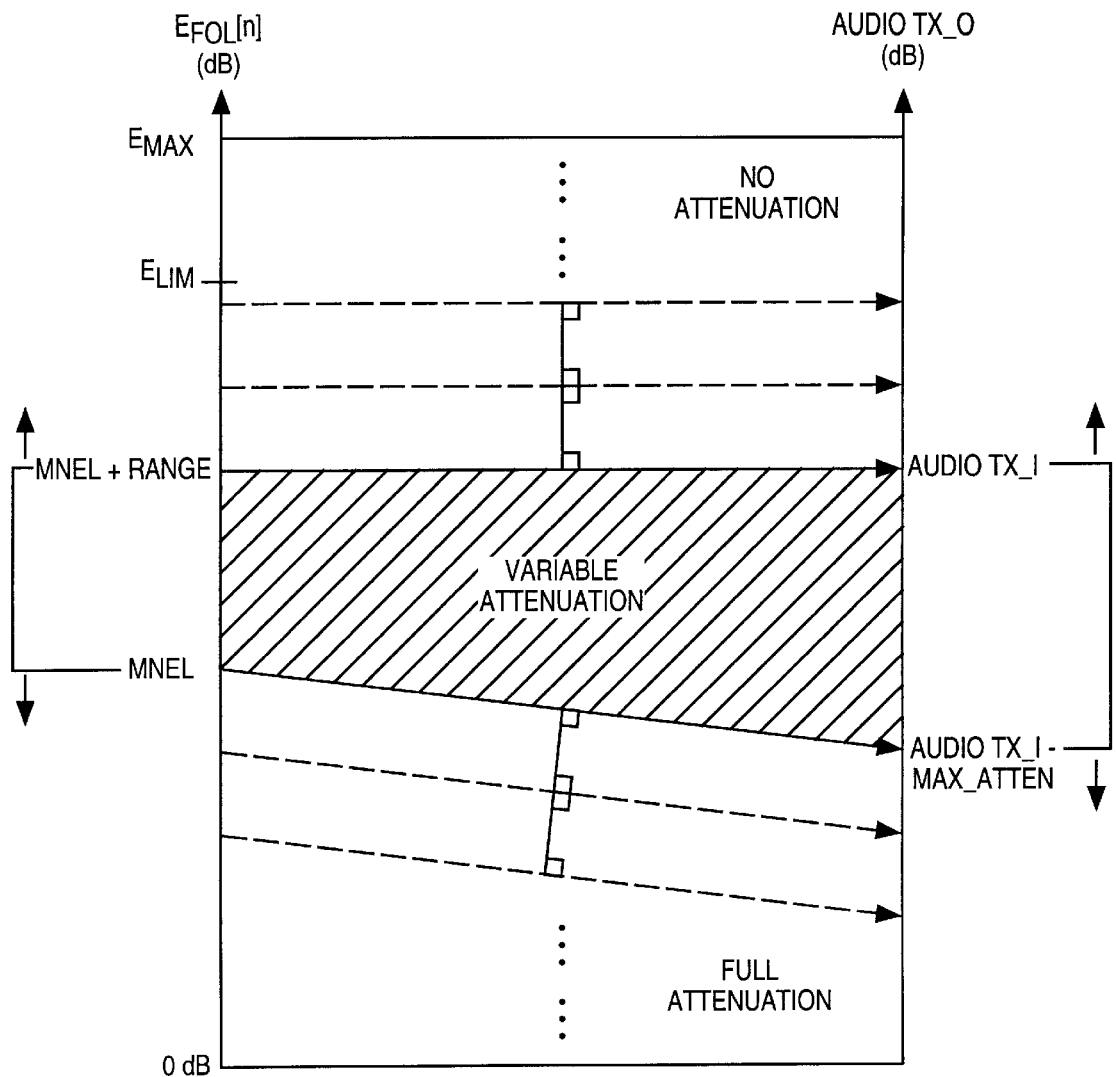
FIG. 20A illustrates the mapping of an input energy level to an output energy level in a noise suppressor.
Figure 20B:
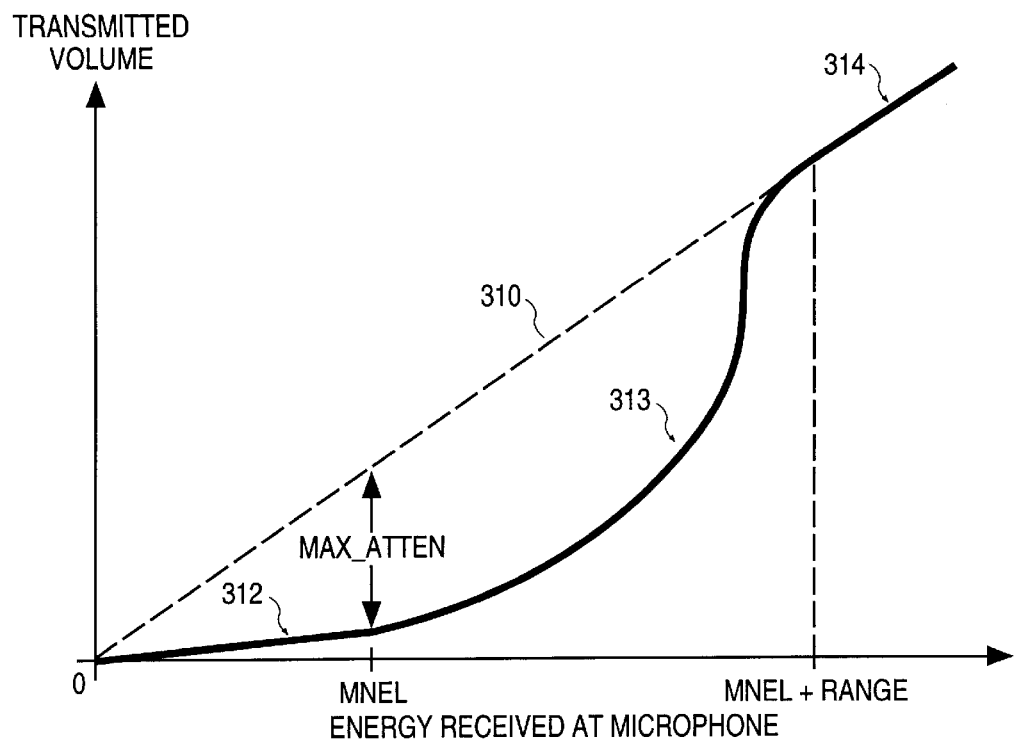
FIG. 20B illustrates an audio signal attenuated based on an exponential attenuation function.

FIG. 20A illustrates the overall mapping scheme performed by energy mapper 274 in conjunction with log-to-linear converter 275 and variable attenuator 276. The left vertical axis in FIG. 20A specifies values of follower energy $E_{FOL}[n]$, while the right vertical axis specifies values of the output signal AUDIO TX_O. $E_{MAX}$ indicates the limit of the dynamic range of the A/D converter within audio front-end circuitry 253. For a 16-bit A/D converter, the dynamic range (0 to $E_{MAX}$) would be approximately 96 dB.

According to one embodiment, maximum attenuation will be applied to the input signal AUDIO TX_I when the values of $E_{FOL}$ falls below MNEL. In particular, the value of AUDIO TX_O in such instances will be set equal to MNEL minus a predetermined maximum attenuation value, MAX_ATTEN (specified in dB). In one embodiment, MAX_ATTEN is set equal to 9 dB, however, the value of MAX_ATTEN can be chosen to produce the desired performance characteristics. Values such as 6 dB and 12 dB, for example, may also produce desirable performance characteristics. Thus, when the signal $E_{FOL}$ equals MNEL, the value of AUDIO TX_O will be set equal to MNEL−MAX_ATTEN.

If the value of $E_{FOL}$ exceeds a predetermined energy level, (MNEL+RANGE), which is greater than MNEL but less than $E_{MAX}$, then no attenuation is applied to signal AUDIO $TX_{13}$ I, such that the value of output signal AUDIO TX_O equals the value of input signal AUDIO TX_I. The value RANGE in the quantity (MNEL+RANGE) is selected based on the signal-to-noise ratio of the input device that is being used (e.g., microphone 53 or headset 51). An example of a value for RANGE that may be suitable for one type of microphone is 10 dB.

For values of $E_{FOL}$ which fall between MNEL and (MNEL+RANGE), the signal AUDIO TX_I is attenuated based on a nonlinear attenuation function. The non-linear attenuation function defines exponential variation in applied attenuation $ATTEN_{LOG}$ over the range of $E_{FOL}$ values between MNEL and (MNEL+RANGE).

Thus, in one embodiment, one of three different attenuation functions is applied to signal AUDIO TX_I depending upon the energy level of $E_{FOL}$ relative to the current noise level: 1) if signal $E_{FOL}$ falls below MNEL, then the output $ATTEN_{LOG}$ of the energy mapper 274 is set equal to the maximum attenuation value, MAX_ATTEN, as represented by section 312 of the plot in FIG. 20B; 2) if EPOL exceeds (MNEL+RANGE), then $ATTEN_{LOG}$ is set to zero (no attenuation is applied), as represented by section 314 of the plot in FIG. 20B; and 3) if $E_{FOL}$ falls between MNEL and (MNEL+RANGE), then $ATTEN_{LOG}$ is computed approximately according to curve 313 in FIG. 20B.

Figure 20C:
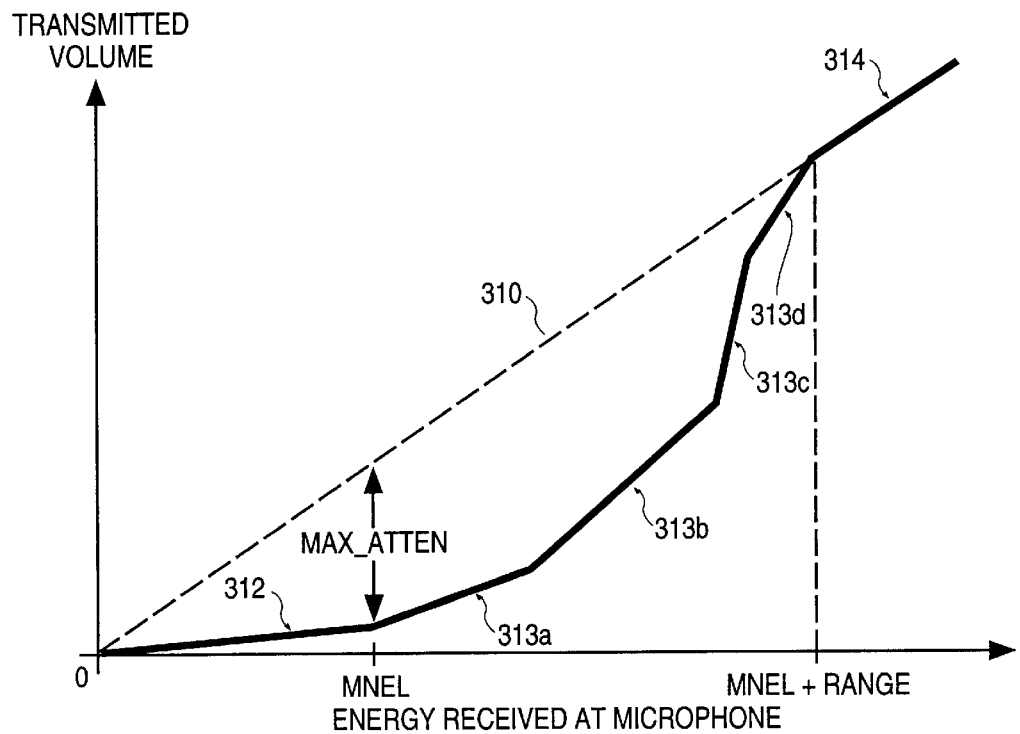
FIG. 20C illustrates an audio signal attenuated based on an exponential attenuation function that is approximated by linear segments.

In one embodiment the exponential attenuation function represented by curve 313 in FIG. 20B is approximated using a piecewise linear attenuation function. Specifically, as shown in FIG. 20C, curve 313 can be approximated by a number of linear segments 313A, 313B, 313C, and 313D. Further, a look-up table can be used to define the segments 313A, 313B, 313C, and 313D, as indicated above.

Figure 19:
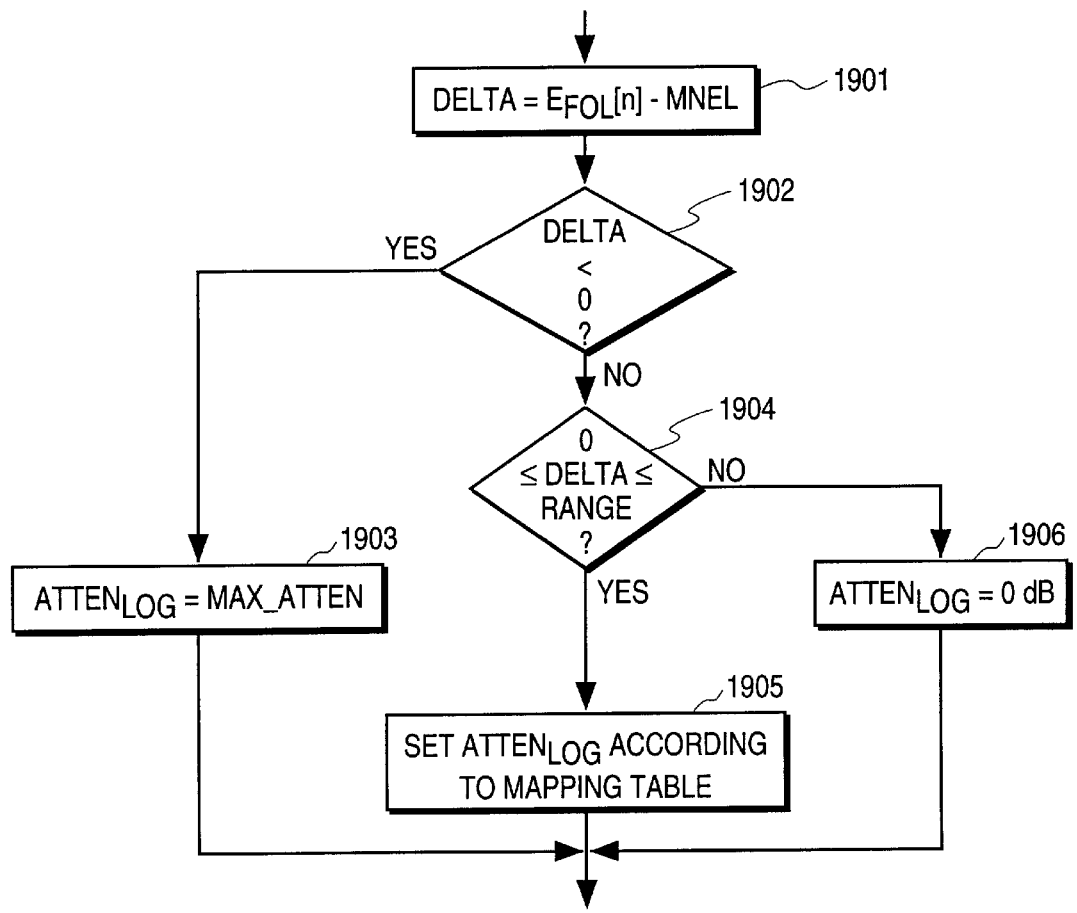
FIG. 19 is a flow diagram illustrating a routine in a noise suppressor for mapping an input energy level to an output energy level.

FIG. 19 illustrates a routine performed by energy mapper 274 for mapping each value $E_{FOL}[n]$ to an attenuation value $ATTEN_{LOG}$. In step 1901, a value DELTA is computed as the difference, $E_{FOL}[n]$ −MNEL. If DELTA is negative in step 1902, then the output $ATTEN_{LOG}$ of energy mapper 274 is set equal to the maximum attenuation value, MAX_ATTEN in step 1903. If DELTA is not negative and is between 0 dB and RANGE, then $ATTEN_{LOG}$ is determined in step 1905 according to the exponential attenuation function (i.e., curve 313 in FIG. 20B). If DELTA is greater than RANGE, then the value $ATTEN_{LOG}$ is set equal to 0 dB in step 1906. The value $ATTEN_{LOG}$ is then provided to log-to-linear converter 275.

In one embodiment, an additional limiting value $E_{LIM}$ (see FIG. 20A) is used to avoid applying the above-described mapping in environments having extremely high ambient noise. Specifically, if the quantity (MNEL+RANGE) reaches the limiting value $E_{LIM}$, then the value of RANGE in the quantity (MNEL+RANGE) is decreased as necessary to prevent the quantity (MNEL+RANGE) from exceeding $E_{LIM}$. As a result, the range in which the (approximated) exponential attenuation function (curve 313) is applicable will become smaller if MNEL continues to increase after (MNEL+RANGE) reaches the limit $E_{LIM}$. If the noise level increases to the point where MNEL reaches the limit $E_{LIM}$, then either no attenuation can be applied or maximum attenuation can be applied, according to the system designer's discretion.

Thus, the noise suppression feature of the present invention provides smoother transitions in transmitted volume in response to changes in input volume in comparison to certain other approaches and dynamically adapts to the ambient noise level at the speaker's location. Perceived gating effects are further reduced by attack and decay throttling. As a result, speech information is preferentially transmitted while non-speech (particularly noise) is preferentially attenuated in generating the output audio signal. Further, noise suppression in accordance with the present invention is not processor-intensive and therefore facilitates multiple instantiations to be performed at high speed, such as when mixing audio streams during multi-point conferencing. Moreover, the noise suppression feature of the present invention does not cause the distortion of voice associated with certain noise cancellation techniques.

Hence, a method and apparatus for suppressing noise in an audio signal have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of suppressing noise in an input signal, the method comprising:
    repeatedly locating a noise level based on the input signal;
    selecting an attenuation function from a plurality of selectable attenuation functions based on the input signal and a current state of the noise level, wherein a first one of the selectable attenuation functions specifies a minimum level for an output signal if the input signal corresponds to a first range, and a second one of the selectable attenuation functions specifies a range of levels for the output signal greater than the minimum level if the input signal corresponds to a second range higher than the first range; and
    applying the selected attenuation function to the signal.

2. A method according to claim 1, wherein the signal may contain noise or data, and wherein said selecting comprises selecting the attenuation function such that during the applying step, noise is preferentially attenuated in comparison to data.

3. A method according to claim 1, wherein one of the selectable attenuation functions represents a non-linear relationships.

4. A method according to claim 3, wherein the non-linear relationship corresponds to an exponential increase in log energy of an output signal in response to a non-exponential increase in log energy of the input signal.

5. A method according to claim 1, wherein the second one of the selectable attenuation functions specifies an exponential relationship between the input signal and the output signal over the second range.

6. A method according to claim 5, wherein a third one of the selectable attenuation functions specifies a maximum level for the output signal if the input signal corresponds to a third range higher than the second range.

7. A method according to claim 1, wherein selecting comprises:

selecting the first one of the selectable attenuation functions if a level of the input signal is below the noise level, wherein the first one of the selectable functions specifies a minimum level of the output signal, and selecting the second one of the selectable attenuation functions if the level of the input signal is within a range above the noise level, wherein the second one of the selectable attenuation functions specifies a plurality of possible levels for the output signal.

8. A method according to claim 1, wherein said repeatedly updating the noise level comprises:

establishing a noise function based on:
a relationship between an approximate peak level of the input signal and a current level of the input signal, and
variation measures of the signal determined for a plurality of time intervals;

repeatedly updating the noise function to produce a current state of the noise function; and using the current state of the noise function to locate the noise level.

9. A method of suppressing noise in a signal, the method comprising inputting an input signal;

repeatedly locating a noise level associated with the input signal to update a current noise level; and generating an output signal by:
attenuating the input signal based on a first attenuation function if the input signal is within a first energy range, wherein the first energy range is defined based on the current noise level; and
attenuating the input signal based on a second attenuation function if the input signal is not within the first energy range, wherein the second attenuation function is different from the first attenuation function.

10. A method according to claim 9, wherein the first attenuation function corresponds to a non-linear relationship between the input signal and an output signal.

11. A method according to claim 10, wherein said attenuating the input signal based on the first attenuation function comprises attenuating the input signal based on a non-linear attenuation function if the input signal corresponds to a level above the current noise level.

12. A method according to claim 11 wherein the said attenuating the input signal based on the first attenuation function further comprises attenuating the input signal based on the non-linear attenuation function if the input signal corresponds to a level between the current noise level and a computed signal level that is higher than the current noise level.

13. A method according to claim 12, further comprising attenuating the input signal based on a first linear attenuation function if the input signal corresponds to a level above the computed signal level;

wherein said attenuating the input signal based on the second attenuation function comprises attenuating the input signal based on a first linear attenuation function if the input signal corresponds to a level above the computed signal level.

14. A method according to claim 9, wherein said repeatedly locating the noise level comprises:

establishing a noise function based on:
a relationship between an approximate peak level of the input signal and a current level of the input signal, and
variation measures of the input signal determined for a plurality of time intervals;

repeatedly updating the noise function to produce a current state of the noise function; and using the current state of the noise function to locate the noise level.

15. A method of suppressing noise in a transmitted audio signal, the method comprising the steps of:

inputting an audio signal;

repeatedly locating a noise level associated with the audio signal while performing the inputting step, to update a current noise level;

attenuating the audio signal using a first constant attenuation value if the audio signal is below the current noise level;

attenuating the audio signal based on an exponential attenuation function if the audio signal is within a first range defined relative to the current noise level; and attenuating the audio signal using a second constant attenuation value if the input signal is not within the first range.

16. A method according to claim 15, wherein the step of repeatedly locating the noise level comprises the steps of:

establishing a noise function based on:
a relationship between an approximate peak level of the audio signal and a current level of the audio signal, and
variation measures of the audio signal determined for a plurality of time intervals;

repeatedly updating the noise function to produce a current state of the noise function; and using the current state of the noise function to locate the noise level.

17. A machine-readable program storage medium tangibly embodying a program of instructions, the instructions executable on a computer system to perform a method of suppressing noise in a signal, the method comprising:

inputting an input signal;

repeatedly locating a noise level based on the input signal during said inputting;

selecting an attenuation function from a plurality of selectable attenuation functions based on the input signal and a current state of the noise level, wherein a first one of the selectable attenuation functions specifies a minimum level for an output signal if the input signal corresponds to a first range, and a second one of the selectable attenuation functions specifies a range of levels for the output signal greater than the minimum level if the input signal corresponds to a second range higher than the first range; and applying the selected attenuation function to the signal.

18. A machine-readable program storage medium according to claim 17, wherein one of the selectable attenuation functions represents a non-linear relationship.

19. A machine-readable program storage medium according to claim 18, wherein the non-linear relationship corresponds to an exponential decrease in log energy of an output signal with a non-exponential decrease in log energy of the input signal.

20. A machine-readable program storage medium according to claim 17, wherein:

the second one of the selectable attenuation functions specifies an exponential relationship between the input signal and the output signal over the second range; and a third one of the selectable attenuation functions specifies a maximum level for the output signal if the input signal corresponds to a third range higher than the second range.

21. A machine-readable program storage medium according to claim 17, wherein said repeatedly updating the noise level comprises:
    establishing a noise function based on:
        a relationship between an approximate peak level of the signal and a current level of the signal, and
        variation measures of the signal determined for a plurality of time intervals;
    repeatedly updating the noise function to produce a current state of the noise function;
    using the current state of the noise function to locate the noise level.

22. A computer system comprising:
    a processor; and
    a memory coupled to the processor, wherein the processor is configured by instructions stored in the memory to:
        input an input signal;
        repeatedly locate a noise level associated with the input signal to update a current noise level; and
        generate an output signal by:
            attenuating the input signal based on a first attenuation function if the input signal is within a first energy range, wherein the first energy range is defined based on the current noise level; and
            attenuating the input signal based on a second attenuation function if the input signal is not within the first energy range, wherein the second attenuation function is different from the first attenuation function.

23. A computer system according to claim 22, wherein the first attenuation function corresponds to a non-linear relationship between the input signal and an output signal, and wherein the processor is further configured to attenuate the input signal based on a non-linear relationship if the input signal exceeds a first computed signal level and does not exceed a second computed signal level.

24. A computer system according to claim 23, wherein the processor is further configured to repeatedly locate the noise level by:
    establishing a noise function based on:
        a relationship between an approximate peak level of the signal and a current level of the signal, and
        variation measures of the signal determined for a plurality of time intervals;
    repeatedly updating the noise function to produce a current state of the noise function; and
    using the current state of the noise function to locate the noise level.

25. An apparatus comprising:
    means for inputting an input audio signal;
    means for repeatedly locating a noise level based on the input audio signal, while inputting the input audio signal, to update a current noise level;
    means for attenuating the input audio signal using a first constant attenuation value if the input audio signal is below the current noise level;
    means for attenuating the input audio signal based on an exponential attenuation function if the input signal exceeds the current noise level and is below a computed level greater than the noise level; and
    means for attenuating the input audio signal using a second constant attenuation value if the input signal exceeds the predetermined level.

26. An apparatus according to claim 25, wherein the means for repeatedly locating the noise level comprises:
    means for establishing a noise function based on:
        a relationship between an approximate peak level of the signal and a current level of the signal, and
        variation measures of the signal determined for a plurality of time intervals;
    means for repeatedly updating the noise function to produce a current state of the noise function; and
    means for using the current state of the noise function to locate the noise level.

27. A method according to claim 1, wherein the signal is an audio signal.

28. A method according to claim 9, wherein the input signal is an audio signal.

* * * * *

UNITED STATES PATENT AND TRADEMARK OFFICE
CERTIFICATE OF CORRECTION

PATENT NO. : 6,175,634 B1  
DATED : January 16, 2001  
INVENTOR(S) : Graumann

It is certified that error appears in the above-identified patent and that said Letters Patent is hereby corrected as shown below:

<u>Column 13,</u>  
Line 33, delete "EPOL" and insert -- $E_{FOL}$ --.

Signed and Sealed this

Twenty-sixth Day of March, 2002

Attest:

JAMES E. ROGAN  
*Director of the United States Patent and Trademark Office*

*Attesting Officer*